United States Patent
Nakamura et al.

(10) Patent No.: US 12,525,334 B2
(45) Date of Patent: Jan. 13, 2026

(54) MEDICAL INFORMATION PROCESSING DEVICE, METHOD FOR OPERATING MEDICAL INFORMATION PROCESSING DEVICE, AND PROGRAM

(71) Applicant: FUJIFILM Corporation, Tokyo (JP)

(72) Inventors: Keigo Nakamura, Tokyo (JP); Ryota Ozaki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 434 days.

(21) Appl. No.: 18/155,746

(22) Filed: Jan. 18, 2023

(65) Prior Publication Data

US 2023/0253097 A1  Aug. 10, 2023

(30) Foreign Application Priority Data

Feb. 4, 2022 (JP) ................. 2022-016652

(51) Int. Cl.
*G16H 30/20* (2018.01)
*G16H 40/60* (2018.01)

(52) U.S. Cl.
CPC ............. *G16H 30/20* (2018.01); *G16H 40/60* (2018.01)

(58) Field of Classification Search
None
See application file for complete search history.

(56) References Cited

U.S. PATENT DOCUMENTS

| | | | |
|---|---|---|---|
| 9,081,877 B2 | 7/2015 | Futami et al. | |
| 10,628,476 B2 | 4/2020 | Sohma | |
| 2014/0365232 A1* | 12/2014 | Sadeghi | G16H 50/20 705/2 |
| 2020/0411200 A1 | 12/2020 | Oka | |
| 2022/0417192 A1* | 12/2022 | Dotan-Cohen | G06F 40/30 |

FOREIGN PATENT DOCUMENTS

| | | |
|---|---|---|
| JP | 2003122850 | 4/2003 |
| JP | 2011010889 | 1/2011 |
| JP | 2016151827 | 8/2016 |
| JP | 2021002309 | 1/2021 |
| WO | 2005122002 | 12/2005 |

OTHER PUBLICATIONS

"Notice of Reasons for Refusal of Japan Counterpart Application", issued on Nov. 7, 2025, with English translation thereof, p. 1-p. 10.
Osamu Kawaguchi, "Considering the Interpretation Workflow in Diagnostic Imaging", Video Information Medical, vol. 40, Dec. 2018, with concise explanation of relevance from English translation of Notice of Reasons for Refusal of Japan Counterpart Application, pp. 1-7.

* cited by examiner

*Primary Examiner* — Lennin R Rodriguezgonzalez
(74) *Attorney, Agent, or Firm* — JCIPRNET

(57) ABSTRACT

Provided are a medical information processing device, a method for operating a medical information processing device, and a program which can provide support for creating a new medical text.
A sentence input by a user is acquired in response to the input. Switching of an attribute of information described in the sentence is determined as a delimiter of the sentence. A structuration process is performed for each unit delimited by the delimiter. The determination is ended according to an end of creation of a medical text including one or more of the sentences. A result of the structuration process is output.

20 Claims, 36 Drawing Sheets

FIG. 15

SOLID TUMOR WITH MAJOR AXIS OF 3 cm IN RIGHT LUNG S4 IS CONFIRMED. BOUNDARY IS UNCLEAR, MARGIN IS LOBULATED, AND SPICULA IS PRESENT. TAIL SIGN IS ALSO CONFIRMED. CALCIFICATION, CAVITY, OR AIR BRONCHOGRAM IS NOT INCLUDED INSIDE.
MICROCYST IN LIVER ISI

| ORGAN | LOCATION | LESION | FACTUALITY | DISEASE NAME | FACTUALITY | SIZE | PROPERTIES |
|---|---|---|---|---|---|---|---|
| LUNG | RIGHT LUNG, S4 | TUMOR | PRESENT | | | MAJOR AXIS OF 3 cm | SOLID TYPE BOUNDARY UNCLEAR LOBULATED (+) TAIL SIGN (+) CALCIFICATION (−) CAVITY (−) AIR BRONCHOGRAM (−) |
| LIVER | | | | | | | |

SOLID TUMOR WITH MAJOR AXIS OF 3 cm IN RIGHT LUNG S4 IS CONFIRMED. — 222
BOUNDARY IS UNCLEAR, MARGIN IS LOBULATED, AND SPICULA IS PRESENT.
TAIL SIGN IS ALSO CONFIRMED. — 226
CALCIFICATION, CAVITY, OR AIR BRONCHOGRAM IS NOT INCLUDED INSIDE.
MICROCYST IN LIVER IS [
                    228

224

204

| ORGAN | LOCATION | LESION | FACTUALITY | DISEASE NAME | FACTUALITY | SIZE | PROPERTIES |
|---|---|---|---|---|---|---|---|
| LUNG | RIGHT LUNG, S4 | TUMOR | PRESENT | | | MAJOR AXIS OF 3 cm | SOLID TYPE<br>BOUNDARY UNCLEAR<br>LOBULATED (+)<br>TAIL SIGN (+)<br>CALCIFICATION (−)<br>CAVITY (−)<br>AIR BRONCHOGRAM (−) |

SOLID TUMOR WITH MAJOR AXIS OF 3 cm IN RIGHT LUNG S4 IS CONFIRMED.
BOUNDARY IS UNCLEAR, MARGIN IS LOBULATED, AND SPICULA IS PRESENT.
TAIL SIGN IS ALSO CONFIRMED.
CALCIFICATION, CAVITY, OR AIR BRONCHOGRAM IS NOT INCLUDED INSIDE.
MICROCYST IN LIVER IS]

| ORGAN | LOCATION | LESION | FACTUALITY | DISEASE NAME | FACTUALITY | SIZE | PROPERTIES |
|---|---|---|---|---|---|---|---|
| LUNG | RIGHT LUNG, S4 | TUMOR | PRESENT | | | MAJOR AXIS OF 3 cm | SOLID TYPE<br>BOUNDARY UNCLEAR<br>LOBULATED (+)<br>TAIL SIGN (+)<br>CALCIFICATION (−)<br>CAVITY (−)<br>AIR BRONCHOGRAM (−) |

FIG. 22

SOLID TUMOR WITH MAJOR AXIS OF 3 cm IN RIGHT LUNG S4 IS CONFIRMED.
BOUNDARY IS UNCLEAR, MARGIN IS LOBULATED, AND SPICULA IS PRESENT.
TAIL SIGN IS ALSO CONFIRMED.
CALCIFICATION, CAVITY, OR AIR BRONCHOGRAM IS NOT INCLUDED INSIDE.
MICROCYST IN LIVER IS CONFIRMED.

| ORGAN | LOCATION | LESION | FACTUALITY | DISEASE NAME | FACTUALITY | SIZE | PROPERTIES |
|---|---|---|---|---|---|---|---|
| LUNG | RIGHT LUNG, S4 | TUMOR | PRESENT | | | MAJOR AXIS OF 3 cm | SOLID TYPE<br>BOUNDARY UNCLEAR<br>LOBULATED (+)<br>TAIL SIGN (+)<br>CALCIFICATION (−)<br>CAVITY (−)<br>AIR BRONCHOGRAM (−) |

FIG. 23

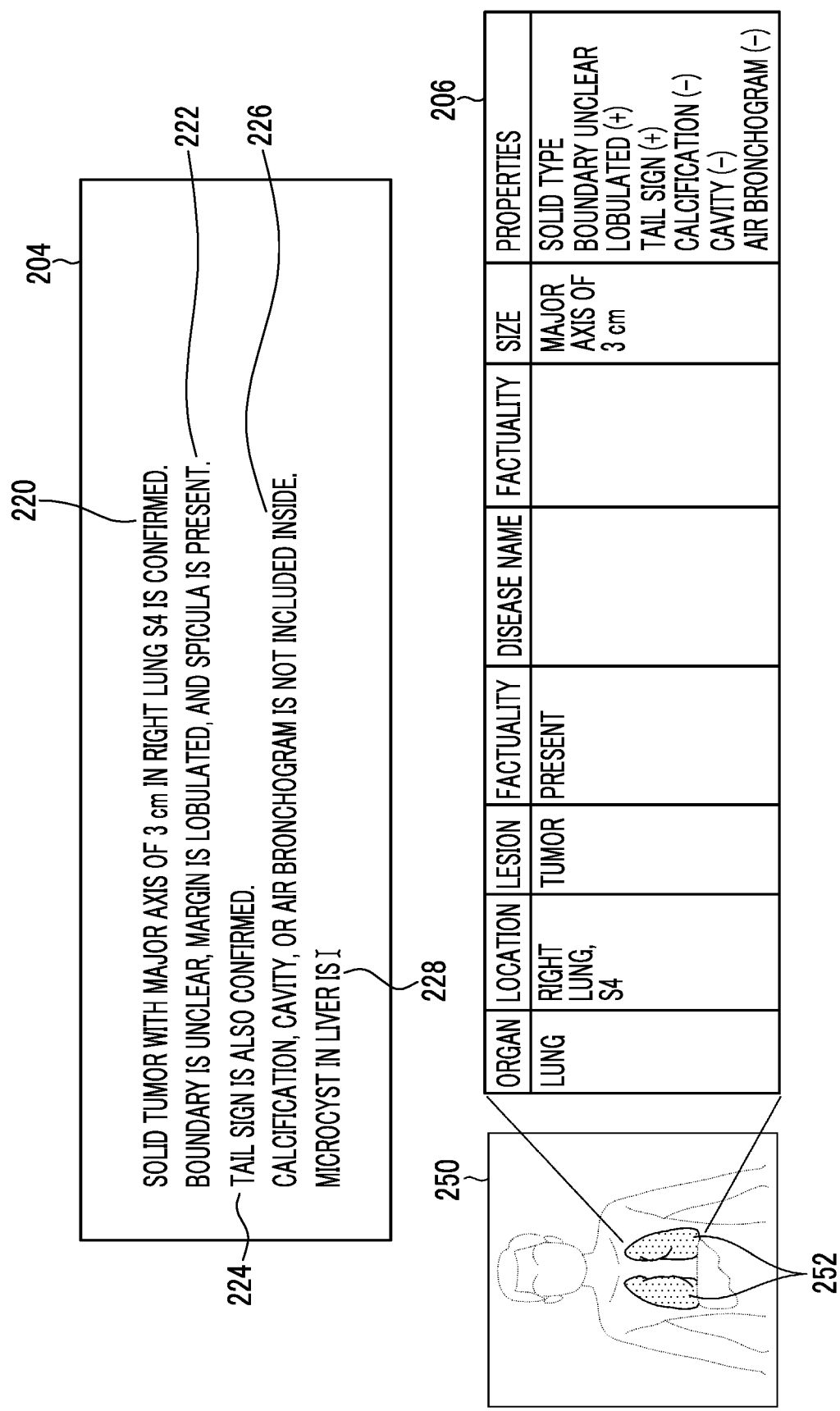

220 — SOLID TUMOR WITH MAJOR AXIS OF 3 cm IN RIGHT LUNG S4 IS CONFIRMED. BOUNDARY IS UNCLEAR, MARGIN IS LOBULATED, AND SPICULA IS PRESENT. TAIL SIGN IS ALSO CONFIRMED. CALCIFICATION, CAVITY, OR AIR BRONCHOGRAM IS NOT INCLUDED INSIDE. MICROCYST IN LIVER IS I

| ORGAN | LOCATION | LESION | FACTUALITY | DISEASE NAME | FACTUALITY | SIZE | PROPERTIES |
|---|---|---|---|---|---|---|---|
| LUNG | RIGHT LUNG, S4 | TUMOR | PRESENT | | | MAJOR AXIS OF 3 cm | SOLID TYPE<br>BOUNDARY UNCLEAR<br>LOBULATED (+)<br>TAIL SIGN (+)<br>CALCIFICATION (−)<br>CAVITY (−)<br>AIR BRONCHOGRAM (−) |

220: SOLID TUMOR WITH MAJOR AXIS OF 3 cm IN RIGHT LUNG S4 IS CONFIRMED. BOUNDARY IS UNCLEAR, MARGIN IS LOBULATED, AND SPICULA IS PRESENT. TAIL SIGN IS ALSO CONFIRMED. CALCIFICATION, CAVITY, OR AIR BRONCHOGRAM IS NOT INCLUDED INSIDE. MICROCYST IN LIVER IS CONFIRMED.

| ORGAN | LOCATION | LESION | FACTUALITY | DISEASE NAME | FACTUALITY | SIZE | PROPERTIES |
|---|---|---|---|---|---|---|---|
| LIVER | | MICROCYST | PRESENT | | | REDUCED | |

SOLID TUMOR WITH MAJOR AXIS OF 40 mm IN MIDDLE LOBE OF RIGHT LUNG S4 IS CONFIRMED.
LOW-DENSITY AREA IN LIVER S1 IS CONFIRMED.
CALCULUS IN GALL BLADDER IS CONFIRMED.

206B

| ORGAN | LOCATION | LESION | FACTUALITY | SIZE | PROPERTIES | COMPARISON |
|---|---|---|---|---|---|---|
| LUNG | RIGHT LUNG, MIDDLE LOBE, S4 | TUMOR | PRESENT | MAJOR AXIS OF 40 mm | SOLID TYPE | |
| LIVER | S1 | LOW-DENSITY AREA | PRESENT | | | |
| GALL BLADDER | | CALCULUS | PRESENT | | | |

FIG. 26

260 — TUMOR IN MIDDLE LOBE OF RIGHT LUNG S4 INCREASES TO 50 mm.
IN LIVER S1 — 262

204

| ORGAN | LOCATION | LESION | FACTUALITY | SIZE | PROPERTIES | COMPARISON |
|---|---|---|---|---|---|---|
| LUNG | S4 | TUMOR | PRESENT | MAJOR AXIS OF 50 mm | | INCREASED |

206

TUMOR IN MIDDLE LOBE OF RIGHT LUNG S4 INCREASES TO 50 mm. IN LIVER S1

| ORGAN | LOCATION | LESION | FACTUALITY | SIZE | PROPERTIES | COMPARISON |
|---|---|---|---|---|---|---|
| LUNG | RIGHT LUNG, MIDDLE LOBE, S4 | TUMOR | PRESENT | MAJOR AXIS OF 50 mm (40 mm → 50 mm) | SOLID TYPE | INCREASED |

FIG. 30

SOLID TUMOR WITH MAJOR AXIS OF 40 mm IN MIDDLE LOBE OF RIGHT LUNG S4 IS CONFIRMED.
LOW-DENSITY AREA IN LIVER S1 IS CONFIRMED.
CALCULUS IN GALL BLADDER IS CONFIRMED.
CYSTIC TUMOR IN PANCREAS IS CONFIRMED.

| ORGAN | LOCATION | LESION | FACTUALITY | SIZE | PROPERTIES | COMPARISON |
|---|---|---|---|---|---|---|
| LUNG | RIGHT LUNG, MIDDLE LOBE, S4 | TUMOR | PRESENT | MAJOR AXIS OF 40 mm | SOLID TYPE | |
| LIVER | S1 | LOW-DENSITY AREA | PRESENT | | | |
| GALL BLADDER | | CALCULUS | PRESENT | | | |
| PANCREAS | | CYSTIC TUMOR | PRESENT | | | |

FIG. 31

SOLID TUMOR WITH MAJOR AXIS OF 40 mm IN MIDDLE LOBE OF RIGHT LUNG S4 IS CONFIRMED.
LOW-DENSITY AREA IN LIVER S1 IS CONFIRMED.
CYSTIC TUMOR IN PANCREAS IS CONFIRMED.

| ORGAN | LOCATION | LESION | FACTUALITY | SIZE | PROPERTIES | COMPARISON |
|---|---|---|---|---|---|---|
| LUNG | RIGHT LUNG, MIDDLE LOBE, S4 | TUMOR | PRESENT | MAJOR AXIS OF 40 mm | SOLID TYPE | |
| LIVER | S1 | LOW-DENSITY AREA | PRESENT | | | |
| PANCREAS | | CYSTIC TUMOR | PRESENT | | | |

FIG. 33

SOLID TUMOR WITH MAJOR AXIS OF 40 mm IN MIDDLE LOBE OF RIGHT LUNG S4 IS CONFIRMED.
LOW-DENSITY AREA IN LIVER S1 IS CONFIRMED.
CALCULUS IN GALL BLADDER IS CONFIRMED. TUMOR WITH MAJOR AXIS OF 20 mm IS PRESENT IN KIDNEY.
CYSTIC TUMOR IN PANCREAS IS CONFIRMED.

| ORGAN | LOCATION | LESION | FACTUALITY | SIZE | PROPERTIES | COMPARISON |
|---|---|---|---|---|---|---|
| LUNG | RIGHT LUNG, MIDDLE LOBE, S4 | TUMOR | PRESENT | MAJOR AXIS OF 40 mm | SOLID TYPE | |
| LIVER | S1 | LOW-DENSITY AREA | PRESENT | | | |
| GALL BLADDER | | CALCULUS | PRESENT | | | |
| KIDNEY | | TUMOR | PRESENT | MAJOR AXIS OF 20 mm | | |
| PANCREAS | | CYSTIC TUMOR | PRESENT | | | |

MEDICAL INFORMATION PROCESSING DEVICE, METHOD FOR OPERATING MEDICAL INFORMATION PROCESSING DEVICE, AND PROGRAM

CROSS-REFERENCE TO RELATED APPLICATION

The present application claims priority under 35 U.S.C § 119(a) to Japanese Patent Application No. 2022-016652 filed on Feb. 4, 2022, which is hereby expressly incorporated by reference, in its entirety, into the present application.

BACKGROUND OF THE INVENTION

1. Field of the Invention

The present invention relates to a medical information processing device, a method for operating a medical information processing device, and a program.

2. Description of the Related Art

In an interpretation report which is one of medical texts created in a medical field, a doctor's opinion obtained by observing a medical image captured by a medical apparatus, such as a CT apparatus or an MRI apparatus, and understanding properties, such as the location, size, shape and internal structure of each disease, is described as an opinion letter.

A medical text, such as an interpretation report, is text-format data that is freely described by health care workers including a doctors and is unstructured data that is difficult to use for secondary purposes, such as statistical analysis and content analysis, as it is. There is an increasing need for structuring a medical text for the purpose of utilizing information described in the medical text.

JP2016-151827A discloses an information processing device that analyzes a sentence, which has been freely described, to acquire terminology, such as medical terms, classifies the terminology on the basis of a usage pattern of the terminology, and presents the classification results on the basis of a unified presentation order.

The device disclosed in JP2016-151827A performs morphological analysis that acquires the terms used in the sentence in units of words and syntactic analysis that analyzes the dependency relationship between the words in the sentence analysis. In addition, in the device, statistical information and a co-occurrence relationship are used in the classification of the terminology.

SUMMARY OF THE INVENTION

However, JP2016-151827A discloses the description of the structuration of an interpretation report, but does not disclose the specific description of support for creating an interpretation report. It is difficult to understand what kind of interpretation report creation support is performed from the description of JP2016-151827A.

The invention has been made in view of the circumstances, and an object of the invention is to provide a medical information processing device, a method for operating a medical information processing device, and a program that can provide support for creating a new medical text.

According to an aspect of the present disclosure, there is provided a medical information processing device comprising: one or more processors; and one or more memories that store a program to be executed by the one or more processors. The one or more processors execute commands of the program to acquire a sentence input by a user in response to the input, to determine switching of an attribute of information described in the sentence as a delimiter of the sentence, to perform a structuration process for each unit delimited by the delimiter, to end the determination according to an end of creation of a medical text including one or more of the sentences, and to output a result of the structuration process.

According to the medical information processing device of this aspect of the present disclosure, the switching of the attribute of the term described in the sentence constituting the medical text is set as the delimiter of the medical text, the structuration process is performed for each unit delimited by the delimiter, and the result of the structuration process is output. Therefore, it is possible to output the result of the structuration process for each unit of the delimiter before the creation of the medical text is ended.

The sentence input by the user includes a plurality of words and includes punctuation marks.

The information described in the sentence input by the user can include words constituting the sentence.

The attribute of the word constituting the sentence can be applied as the attribute of the information.

Examples of the medical text include interpretation reports, opinion letters, and various summaries.

According to another aspect, in the medical information processing device, the one or more processors may acquire the sentence indicating an opinion on a medical image.

According to this aspect, the structuration process can be performed for the opinion letter, and the result of the structuration process for the opinion letter can be output.

The medical image is an image generated by imaging a subject using a modality such as a CT apparatus. The medical image may be three-dimensional data or a two-dimensional reconstructed image.

The term "image" can include the meaning of image data which is a signal indicating the image.

According to still another aspect, in the medical information processing device, the one or more processors may determine switching of a term indicating the opinion on the medical image as the delimiter of the sentence, as the switching of the attribute of the information described in the acquired sentence.

According to this aspect, the structuration process for the sentence constituting the medical image can be performed for each switching of the term indicating the opinion on the medical image.

According to yet another aspect, in the medical information processing device, the one or more processors may output the result of the structuration process to a display device.

According to this aspect, the user, such as a doctor, can visually recognize the result of the structuration process.

According to still yet another aspect, in the medical information processing device, the one or more processors may output the result of the structuration process for each attribute.

According to this aspect, the user, such as a doctor, can recognize the result of the structuration process for each attribute.

According to yet still another aspect, in the medical information processing device, in a case in which a term indicating the attribute is detected, the one or more processors may start the structuration process for the unit including the term indicating the attribute and output a provisional result of the structuration process.

According to this aspect, the user, such as a doctor, can recognize the result of the structuration process for the created sentence before the creation of the medical text is ended.

According to still yet another aspect, in the medical information processing device, the one or more processors may acquire a past medical text created in a past and output the result of the structuration process for the acquired sentence in association with a result of the structuration process for the past medical text.

According to this aspect, the result of the structuration process in the past examination can be reflected in the result of the structuration process in the current examination.

According to yet still another aspect, in the medical information processing device, the one or more processors may add information, which is described in the past medical text and is not described in the acquired medical text, to the result of the structuration process for the acquired sentence and output the result of the structuration process.

According to this aspect, it is possible to relatively increase the amount of information in the result of the structuration process.

According to still yet another aspect, in the medical information processing device, the one or more processors may output the result of the structuration process in association with a human body schema.

According to this aspect, the user, such as a doctor, can visually recognize the correspondence relationship between the result of the structuration process and the organ.

According to yet still another aspect, in the medical information processing device, the one or more processors may determine switching of a term indicating a part of a human body as the delimiter of the sentence, as the switching of the attribute of the information described in the acquired sentence.

According to this aspect, the structuration process for the sentence constituting the medical text can be performed for each part of the human body.

According to still yet another aspect, in the medical information processing device, the one or more processors may determine switching of a term indicating an organ of a human body as the delimiter of the sentence, as the switching of the attribute of the information described in the acquired sentence.

According to this aspect, the structuration process for the sentence constituting the medical text can be performed for each organ.

According to yet still another aspect, in the medical information processing device, the one or more processors may acquire a term in the unit and perform the structuration process including a term extraction process of determining a type of the acquired term.

As the type of the term in this aspect, for example, a date and time, a modality used, a lesion, a location in an organ, a degree, and a disease name can be applied.

According to still yet another aspect, in the medical information processing device, the one or more processors may perform the structuration process including a relationship determination process of determining a relationship between a plurality of the terms extracted in the term extraction process.

According to this aspect, the structuration process using the relationship with the terms can be performed.

According to yet still another aspect, in the medical information processing device, the one or more processors may group the acquired sentences on the basis of the result of the structuration process.

According to this aspect, the user, such as a doctor, can recognize the relationship between the result of the structuration process and the grouping of the sentences included in the medical text.

According to still yet another aspect, in the medical information processing device, the one or more processors may perform the grouping on the basis of a relationship between a plurality of terms extracted in the structuration process.

According to this aspect, the sentences constituting the medical text can be grouped on the basis of the terms having a predetermined relationship.

According to yet still another aspect, in the medical information processing device, the one or more processors may output identification information that identifies a result of the grouping in the acquired sentences.

As the identification information in this aspect, a process of changing the display aspect for each term, such as the color of each term, can be applied.

According to still yet another aspect, in the medical information processing device, the one or more processors may acquire information indicating a shift of each grouped unit in the acquired sentences.

According to this aspect, in a case in which the sentence constituting the medical text is corrected, a plurality of sentences belonging to a group can be used as a unit of correction.

According to yet still another aspect, in the medical information processing device, the one or more processors may store the delimiter of the acquired sentence.

According to this aspect, the delimiter in the medical text can be reused.

According to still yet another aspect, in the medical information processing device, the one or more processors may acquire a correction input indicating correction of the sentence input by the user and update the delimiter according to the correction in a case in which the correction input is acquired.

According to this aspect, the result of the structuration process is corrected corresponding to the correction of the sentence constituting the medical text.

According to yet still another aspect, in the medical information processing device, the one or more processors may specify a range of the correction on the basis of the stored delimiter.

According to this aspect, correction for each delimiter of the medical text can be performed.

According to still yet another aspect, in the medical information processing device, the one or more processors may output a result of the structuration process for the corrected sentence.

According to this aspect, the user, such as a doctor, can recognize the correction of the result of the structuration process corresponding to the correction of the medical text.

According to yet still another aspect of the present disclosure, there is provided a method for operating a medical information processing device including one or more processors and one or more memories that store a program to be executed by the one or more processors. The method comprises: causing the one or more processors to acquire a sentence input by a user in response to the input; causing the one or more processors to determine switching of an attribute of information described in the sentence as a delimiter of the sentence; causing the one or more processors to perform a structuration process for each unit delimited by the delimiter; causing the one or more processors to end the determination according to an end of creation of a medical text including one or more of the sentences; and causing the one or more processors to output a result of the structuration process.

According to the method for operating a medical information processing device of the present disclosure, it is possible to obtain the same operation and effect as those of the medical information processing device according to the present disclosure. Components of a medical information processing device according to still yet another aspect can be applied to components of a method for operating a medical information processing device according to yet still another aspect.

According to still yet another aspect of the present disclosure, there is provided a program that causes a computer to implement: a function of acquiring a sentence input by a user in response to the input; a function of determining switching of an attribute of information described in the sentence as a delimiter of the sentence; a function of performing a structuration process for each unit delimited by the delimiter; a function of ending the determination according to an end of creation of a medical text including one or more of the sentences; and a function of outputting a result of the structuration process.

According to the program of the present disclosure, it is possible to obtain the same operation and effect as those of the medical information processing device according to the present disclosure. Components of a medical information processing device according to yet still another aspect can be applied to components of a program according to still yet another aspect.

According to the invention, the switching of the attribute of the term described in the sentence constituting the medical text is set as the delimiter of the medical text, the structuration process is performed for each unit delimited by the delimiter, and the result of the structuration process is output. Therefore, it is possible to output the result of the structuration process for each unit of the delimiter before the creation of the medical text is ended.

BRIEF DESCRIPTION OF THE DRAWINGS

FIG. 15 is a schematic diagram illustrating an example of display in a case in which a delimiter is detected.

FIG. 20 is a schematic diagram illustrating an example of display in a case in which the delimiter is defined.

FIG. 21 is a schematic diagram illustrating another example of the display of the opinion letter in a case in which the structuration process is confirmed.

FIG. 22 is a schematic diagram illustrating an example of display in a case in which the confirmation of the structuration process is indicated using a change in a display aspect of the opinion letter.

FIG. 23 is a schematic diagram illustrating an example of the display of the result of the structuration process associated with a human body schema.

FIG. 25 is a schematic diagram illustrating an example of an opinion letter and a result of a structuration process in a past examination.

FIG. 26 is a schematic diagram illustrating an example of a display screen during the input of the opinion letter.

FIG. 30 is a schematic diagram illustrating an example of display in a case in which the opinion letter is corrected.

FIG. 31 is a schematic diagram illustrating an example of display before the opinion letter is added.

FIG. 33 is a schematic diagram illustrating an example of display before an opinion letter according to another example is added.

DESCRIPTION OF THE PREFERRED EMBODIMENTS

Figure 1:
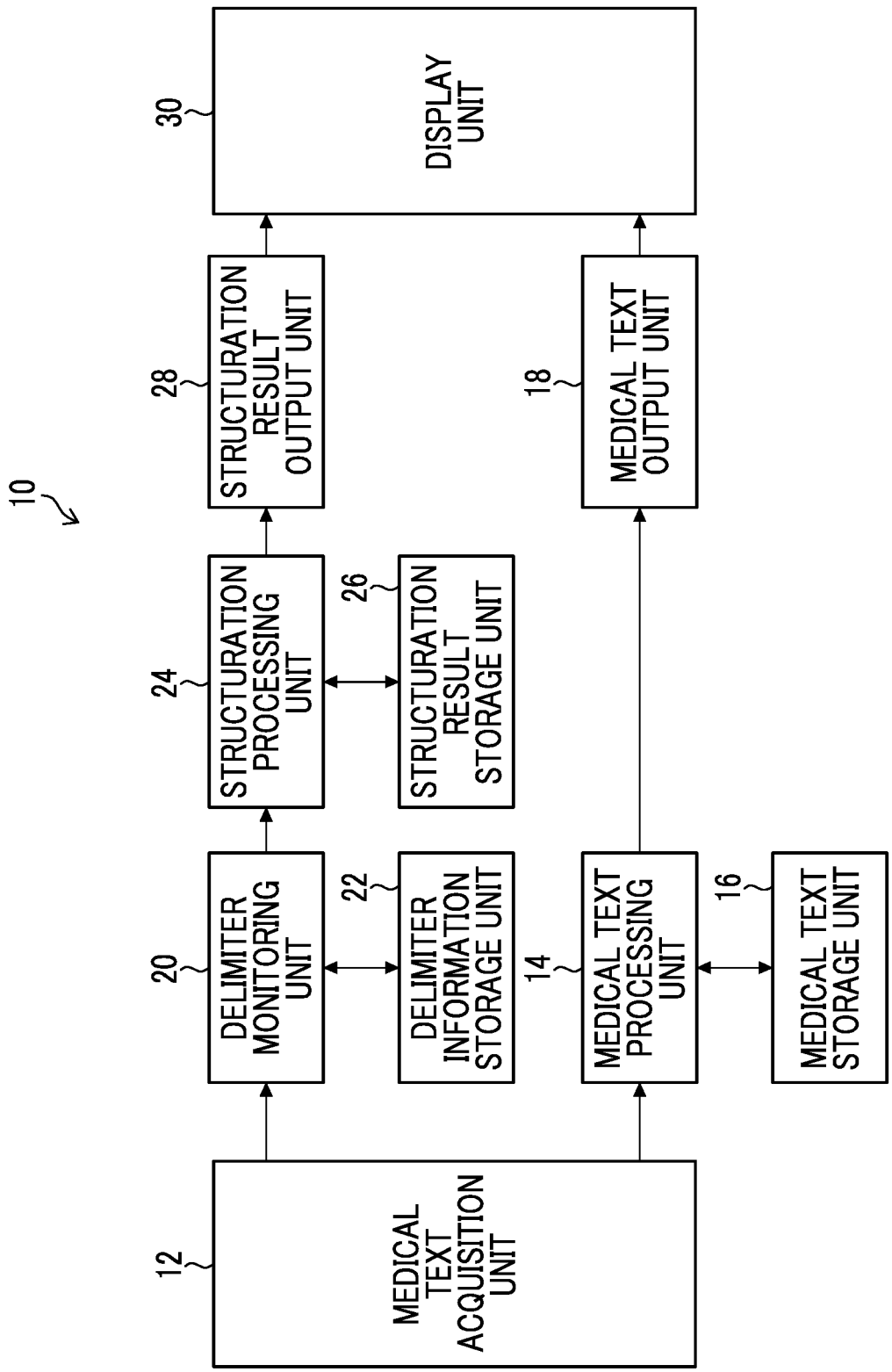
FIG. 1 is a functional block diagram illustrating an outline of processing functions of a medical information processing device according to an embodiment.

Hereinafter, a preferred embodiment of the invention will be described in detail with reference to the accompanying drawings. In the specification, the same components are denoted by the same reference numerals, and the duplicate description thereof will be appropriately omitted.

Example of Configuration of Medical Information Processing Device

FIG. 1 is a functional block diagram illustrating an outline of processing functions of a medical information processing device according to an embodiment. A medical information processing device 10 can be implemented using hardware and software of a computer.

The medical information processing device 10 comprises a medical text acquisition unit 12, a medical text processing unit 14, and a medical text storage unit 16. The medical text acquisition unit 12 acquires a medical text input by a user, such as a doctor, through an input device, such as a keyboard. An example of the medical text is information which is created by a health care worker and managed as medical information, such as an interpretation report and a summary of hospitalization and discharge.

The medical text includes one or more sentences. One sentence includes one or more words and one punctuation mark. The medical text can be acquired and stored as text-format data.

The medical text acquisition unit 12 acquires at least a portion of an input sentence until the input of the sentence, which is being input, is ended, in response to an operation of inputting at least a portion of the sentence constituting an input medical text. The term "being input" is any timing of a period from the start timing of the input to the end timing of the input.

The medical text acquisition unit 12 transmits the acquired medical text to the medical text processing unit 14. For example, the medical text acquisition unit 12 acquires a portion of the input sentence while the sentence constituting the medical text is being input and transmits the acquired portion of the sentence while the sentence constituting the medical text is being input to the medical text processing unit 14.

The medical text processing unit 14 acquires the medical text transmitted from the medical text acquisition unit 12. The medical text processing unit 14 performs a predetermined process for the acquired medical text. An example of the predetermined process is the setting of display conditions such as the type, size, and color of a font. The medical text processing unit 14 stores the acquired medical text and the processed medical text in the medical text storage unit 16.

The medical text processing unit 14 transmits the medical text subjected to the predetermined process to a medical text output unit 18. The medical text output unit 18 converts the medical text into a format to be applied to a display unit 30 and transmits the medical text to the display unit 30.

The medical information processing device 10 comprises a delimiter monitoring unit 20, a delimiter information storage unit 22, a structuration processing unit 24, a structuration result storage unit 26, and a structuration result output unit 28.

The delimiter monitoring unit 20 applies the same conditions as the medical text processing unit 14 to acquire the medical text through the medical text acquisition unit 12. The delimiter monitoring unit 20 monitors a delimiter of the acquired medical text. The delimiter monitoring unit 20 continues to monitor the delimiter of the acquired medical text until the creation of the medical text is ended.

The switching of the attributes of the sentence constituting the medical text can be applied as the delimiter of the medical text. The switching of the attributes of the terms described in the sentence can be applied as the attributes of the sentence. The delimiter monitoring unit 20 stores information of the delimiter of the medical text in the delimiter information storage unit 22.

That is, the delimiter monitoring unit 20 determines the delimiter in the medical text and defines the delimiter in the medical text. In other words, the delimiter monitoring unit 20 defines a boundary between groups in a case in which the medical texts are grouped. In addition, the determination of the delimiter of the medical text will be described in detail below.

The structuration processing unit 24 acquires the medical text, in which the delimiter has been defined, from the delimiter monitoring unit 20 and performs a structuration process for each unit delimited by the delimiter. For example, in a case in which an opinion letter in which a doctor's opinion is described is acquired as the medical text, the structuration process for the opinion letter includes processes, such as opinion letter determination, organ determination, opinion term extraction, factuality determination, and relationship extraction.

The opinion letter determination classifies the content of each sentence constituting the opinion letter into four types of an opinion, diagnosis, comparison, and others. The organ determination determines the type of anatomical structure, such as an organ, for each sentence. The anatomical structure includes, for example, blood vessels, nerves, and bones in addition to the internal organs, such as an organ, a brain, an esophagus, and a lung.

The opinion term extraction extracts words related to, for example, a date and time, a modality, a lesion, a location, a degree, and a disease name for each sentence. The factuality determination determines whether each sentence is positive or negative. For example, the factuality determination determines whether each sentence is a positive sentence including, for example, words "confirm", "possible", and "suspect" or a negative sentence including a word "not confirm".

The relationship extraction extracts the relationship between the sentences. For example, in the relationship extraction, the opinion terms which have been extracted from a plurality of sentences constituting the opinion letter for each organ and each lesion are summarized.

A trained learning model can be applied to the structuration processing unit 24. For example, a trained learning model which has been trained with a set of the sentence to be structured and the result of the structuration process as training data may be applied to the structuration processing unit 24.

The structuration processing unit 24 stores the result of the structuration process in the structuration result storage unit 26. Further, the structuration processing unit 24 transmits the result of the structuration process to the structuration result output unit 28. The structuration result output unit 28 converts the result of the structuration process into a format to be applied to the display unit 30 and transmits the result to the display unit 30.

One or more monitoring devices can be applied to the display unit 30. The display unit 30 may display a text indicating the medical text and the result of the structuration process. The display unit 30 may display the medical image to be interpreted. The display unit 30 can comprise a first monitor device that displays a medical image. The display unit 30 can comprise a second monitor device that displays the medical text and the result of the structuration process for the medical text.

The medical information processing device 10 may be incorporated into a medical information processing system that processes various types of medical information acquired in a medical institution such as a hospital. In addition, the processing functions of the medical information processing device 10 may be provided as a cloud service.

Hardware Configuration of Medical Information Processing Device

Figure 2:
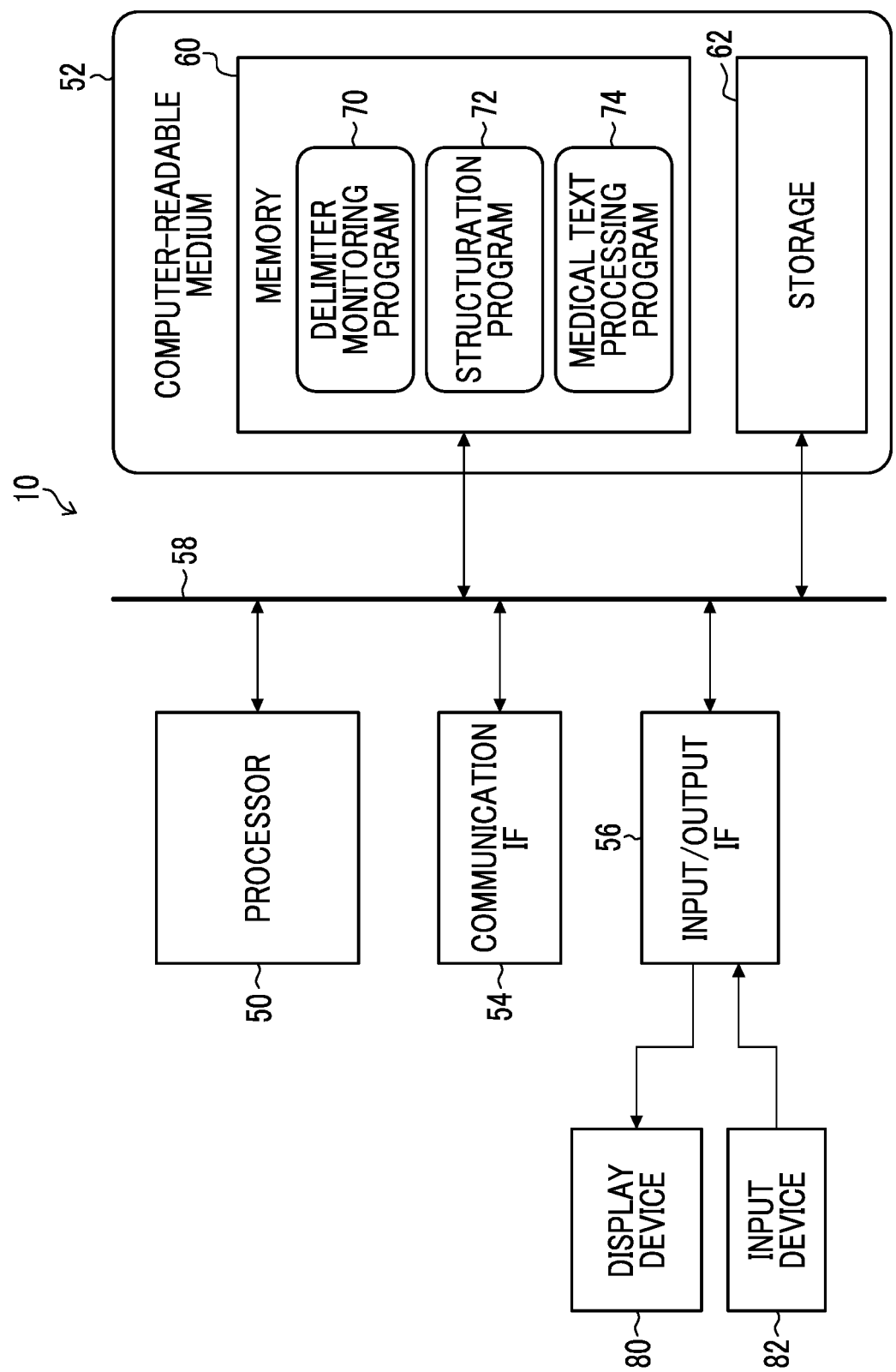
FIG. 2 is a block diagram schematically illustrating an example of a hardware configuration of the medical information processing device illustrated in FIG. 1.

FIG. 2 is a block diagram schematically illustrating an example of a hardware configuration of the medical information processing device illustrated in FIG. 1. The medical information processing device 10 can be implemented by a computer system that is configured using one or a plurality of computers. Here, an example will be described in which one computer executes a program to implement various functions of the medical information processing device 10.

In addition, the form of the computer that functions as the medical information processing device 10 is not particularly limited, and the computer may be, for example, a server computer, a workstation, a personal computer, or a tablet terminal. Further, the computer may be a virtual machine.

The medical information processing device 10 comprises a processor 50, a computer-readable medium 52 which is a non-transitory tangible object, a communication interface 54, an input/output interface 56, and a bus 58. In addition, the IF illustrated in FIG. 2 indicates an interface.

The processor 50 includes a central processing unit (CPU). The processor 50 may include a graphics processing unit (GPU). The processor 50 is connected to the computer-readable medium 52, the communication interface 54, and the input/output interface 56 through the bus 58. The processor 50 reads, for example, various programs and data stored in the computer-readable medium 52 and performs various processes.

The computer-readable medium 52 includes a memory 60 which is a main storage device and a storage 62 which is an auxiliary storage device. The storage 62 may be configured using a hard disk apparatus, a solid state drive device, an optical disk, a magneto-optical disk, and a semiconductor memory. The storage 62 may be configured using an appropriate combination of a hard disk apparatus and the like. For example, various programs and data are stored in the storage 62.

In addition, the hard disk apparatus may be referred to as an HDD which is an abbreviation of Hard Disk Drive in English. Further, the solid state drive device may be referred to as an SSD which is an abbreviation of Solid State Drive in English.

The memory 60 is used as a work area of the processor 50 and is used as a storage unit that temporarily stores the program and various types of data read from the storage 62. The program stored in the storage 62 is loaded into the memory 60, and commands of the program are executed using the processor 50 such that the processor 50 functions as processing units that perform various processes defined by the program. The memory 60 stores, for example, a delimiter monitoring program 70, a structuration program 72, a medical text processing program 74, and various types of data executed by the processor 50.

The delimiter monitoring program 70 causes the processor 50 to perform a delimiter monitoring process executed by the delimiter monitoring unit 20 illustrated in FIG. 1. The structuration program 72 causes the processor 50 to perform the structuration process executed by the structuration processing unit 24.

The medical text processing program 74 causes the processor 50 to perform medical text processing executed by the medical text processing unit 14. The delimiter monitoring program 70, the structuration program 72, and the medical text processing program 74 may include a trained learning model. Each of the programs illustrated in FIG. 2 includes one or more commands. The processor 50 executes the commands included in each program to implement functions corresponding to each program.

The communication interface 54 performs a communication process with an external device wirelessly or in a wired manner to exchange information with the external device. The medical information processing device 10 is connected to a communication line through the communication interface 54. The communication line may be a local area network or a wide area network. The communication interface 54 can play a role of a data acquisition unit that receives the input of data such as an image. In addition, the communication line is not illustrated.

The medical information processing device 10 can comprise a display device 80 and an input device 82. The display device 80 and the input device 82 are connected to the bus 58 through the input/output interface 56. Examples of the input device 82 include a keyboard, a mouse, a multi-touch panel, other pointing devices, and a voice input device. The input device 82 may be an appropriate combination of the keyboard and the like.

The display device 80 is an output interface on which various types of information are displayed. Examples of the display device 80 include a liquid crystal display, an organic EL display, and a projector. The display device 80 may be an appropriate combination of a liquid crystal display and the like. In addition, the organic EL is referred to as an OEL which is an abbreviation of Organic Electro-Luminescence in English. The display device 80 illustrated in FIG. 2 can be used as the display unit 30 illustrated in FIG. 1.

Example of Configuration of Medical Information Management System

Figure 3:
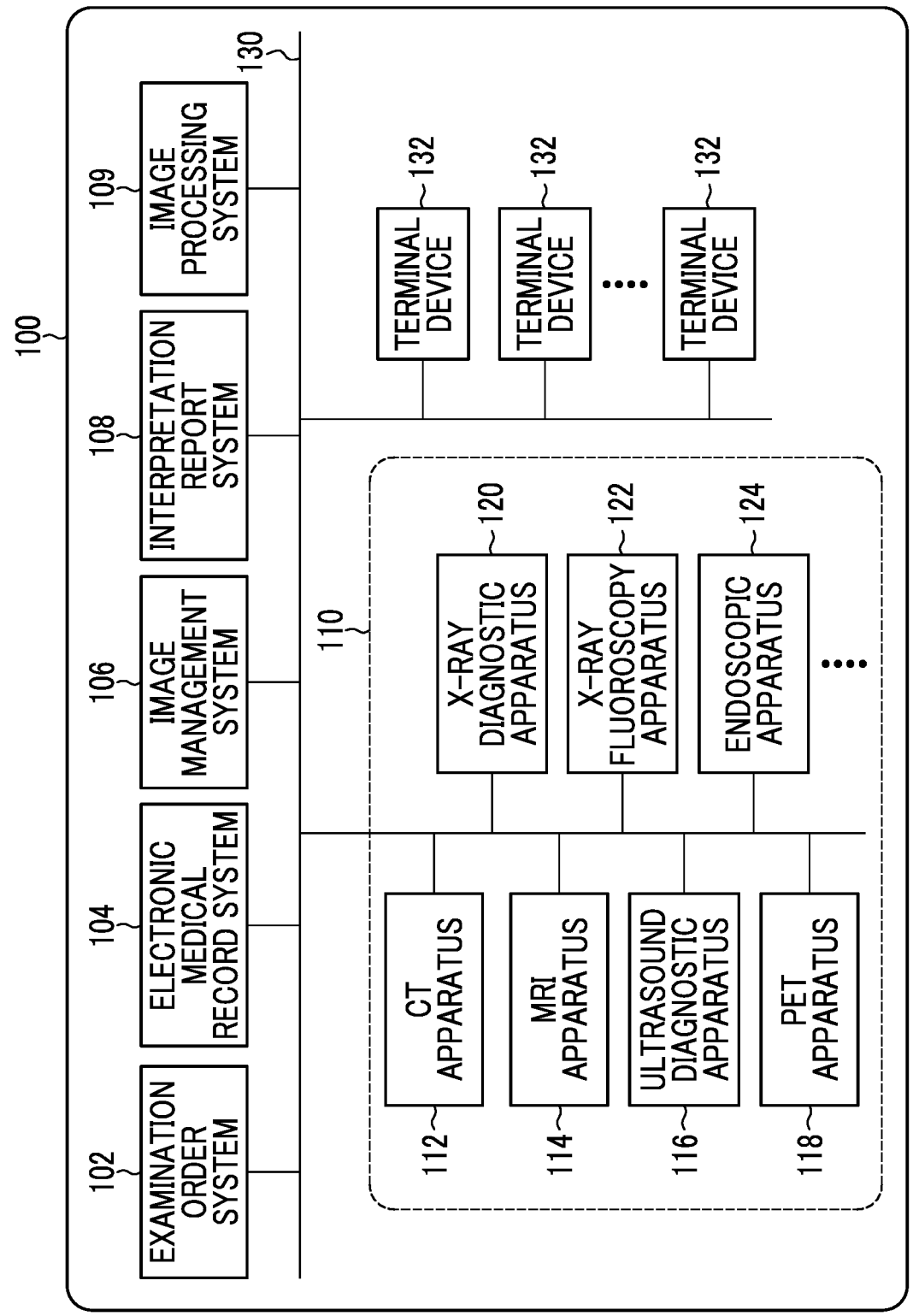
FIG. 3 is a block diagram schematically illustrating an example of a configuration of a medical information management system to which the medical information processing device illustrated in FIG. 1 is applied.

FIG. 3 is a block diagram schematically illustrating an example of a configuration of the medical information management system to which the medical information processing device illustrated in FIG. 1 is applied. The medical information processing device 10 illustrated in FIG. 1 can be incorporated into a medical information management system 100 illustrated in FIG. 3.

The medical information management system 100 is a computer network that is constructed in a medical institution such as a hospital. The medical information management system 100 comprises an examination order system 102, an electronic medical record system 104, an image management system 106, an interpretation report system 108, an image processing system 109, a modality 110, and a terminal device 132.

A server computer can be applied to each of the examination order system 102, the electronic medical record system 104, the image management system 106, and the interpretation report system 108. A form in which a plurality of computers cooperate with each other may be applied to the server computer.

The examination order system 102, the electronic medical record system 104, the image management system 106, the interpretation report system 108, the modality 110, and the terminal device 132 are electrically connected to each other through a communication line 130. This makes it possible for the components of the medical information management system 100 to communicate with each other.

The examination order system 102 manages an examination order that is issued on the basis of an examination order request issued by the doctor. The examination order includes various types of information related to the examination which include patient identification information, such as a patient ID, identification information of a doctor in charge of the examination, such as a doctor-in-charge ID, and a type of examination. The examination order system 102 can comprise an examination order storage device that stores the examination order. In addition, ID is an abbreviation of identification.

The electronic medical record system 104 manages an electronic medical record of each patient. The electronic medical record system 104 can store the patient identification information and the electronic medical record in association with each other and can search for the electronic medical record of each patient using the patient identification information as a parameter.

The electronic medical record system 104 performs a search in response to a request for reading the electronic medical record of each patient which is transmitted from the terminal device 132 and transmits various types of information included in the electronic medical record corresponding to the read request to the terminal device 132.

The electronic medical record system 104 acquires additional information, change information, deletion information, and the like for the electronic medical record transmitted from the terminal device 132 and updates the electronic medical record on the basis of the additional information and the like. The electronic medical record system can comprise an electronic medical record storage device that stores the electronic medical record.

The image management system 106 manages the medical images that are captured and generated by the modality 110. The image management system 106 can comprise a DICOM server. The image management system 106 can comprise an image storage device that stores the medical images.

The DICOM server is a server that operates according to the specifications of DICOM. The DICOM server is a computer that stores various types of data including the images captured by the modality 110 and manages various types of data. The DICOM server comprises a large-capacity external storage device and a database management program.

The DICOM server communicates with other devices through the communication line 130 to transmit and receive various types of data including image data. The DICOM server receives the image data generated by the modality 110 and other various types of data through the communication line 130, stores the data in a recording medium, such as a large-capacity external storage device, and manages the data. In addition, the storage format of the image data and the communication between the devices through the communication line 130 are based on a DICOM protocol.

The image management system 106 may store a three-dimensional image constructed from the imaging data of the modality 110 or may store a two-dimensional reconstructed image reconstructed from the three-dimensional image. The image management system 106 may transmit the three-dimensional image or the two-dimensional reconstructed image reconstructed from the three-dimensional image to, for example, the image processing system 109 and the terminal device 132.

The interpretation report system 108 manages the interpretation report created by an interpretation doctor. The interpretation report system 108 stores the interpretation report associated with the electronic medical record and the medical image. The interpretation report system 108 comprises an interpretation report creation support device that supports the creation of the interpretation report.

The image processing system 109 can acquire data from, for example, the image management system 106 through the communication line 130. The image processing system 109 performs image analysis and various other processes on the medical image captured by the modality 110. The image processing system 109 may be configured to perform, for example, various computer-aided diagnosis analysis processes, such as a process of recognizing a lesion region and the like from an image, a process of specifying a classification, such as a disease name, and a segmentation process of recognizing a region, such as an organ. In addition, the computer-aided diagnosis can be referred to as CAD which is an abbreviation of Computer Aided Diagnosis or Computer Aided Detection.

In addition, the image processing system 109 can transmit the processing result to the image management system 106 and the terminal device 132. In addition, the processing functions of the image processing system 109 may be provided in the image management system 106 or in the terminal device 132.

Various types of information including various types of data stored in the database of the image management system 106 and the processing result generated by the image processing system 109 can be displayed on a monitor device that is connected to the terminal device 132.

The terminal device 132 can function as a terminal for viewing an image which is called a PACS viewer or a DICOM viewer. A plurality of terminal devices 132 may be connected to the communication line 130. In addition, PACS is an abbreviation of Picture Archiving and Communication System. The form of the terminal device 132 is not particularly limited and may be, for example, a personal computer, a workstation, or a tablet terminal.

The medical information processing device 10 illustrated in FIGS. 1 and 2 can be configured by the interpretation report system 108 and the terminal device 132 illustrated in FIG. 3. For example, the medical information processing device 10 can be configured by associating the interpretation report creation support device provided in the interpretation report system 108 with the terminal device 132.

Specific examples of the modality 110 include a CT apparatus 112, an MM apparatus 114, an ultrasound diagnostic apparatus 116, a PET apparatus 118, an X-ray diagnostic apparatus 120, an X-ray fluoroscopy apparatus 122, and an endoscopic apparatus 124. There may be various combinations of the types of the modalities 110 connected to the communication line 130 for each medical institution. In addition, MRI is an abbreviation of Magnetic Resonance Imaging. PET is an abbreviation of Positron Emission Tomography.

The communication line 130 may be a local communication line in the medical institution. Further, a portion of the communication line 130 may be a wide area communication line.

Procedure of Structuration Process in Creation of Medical Text

Figure 4:
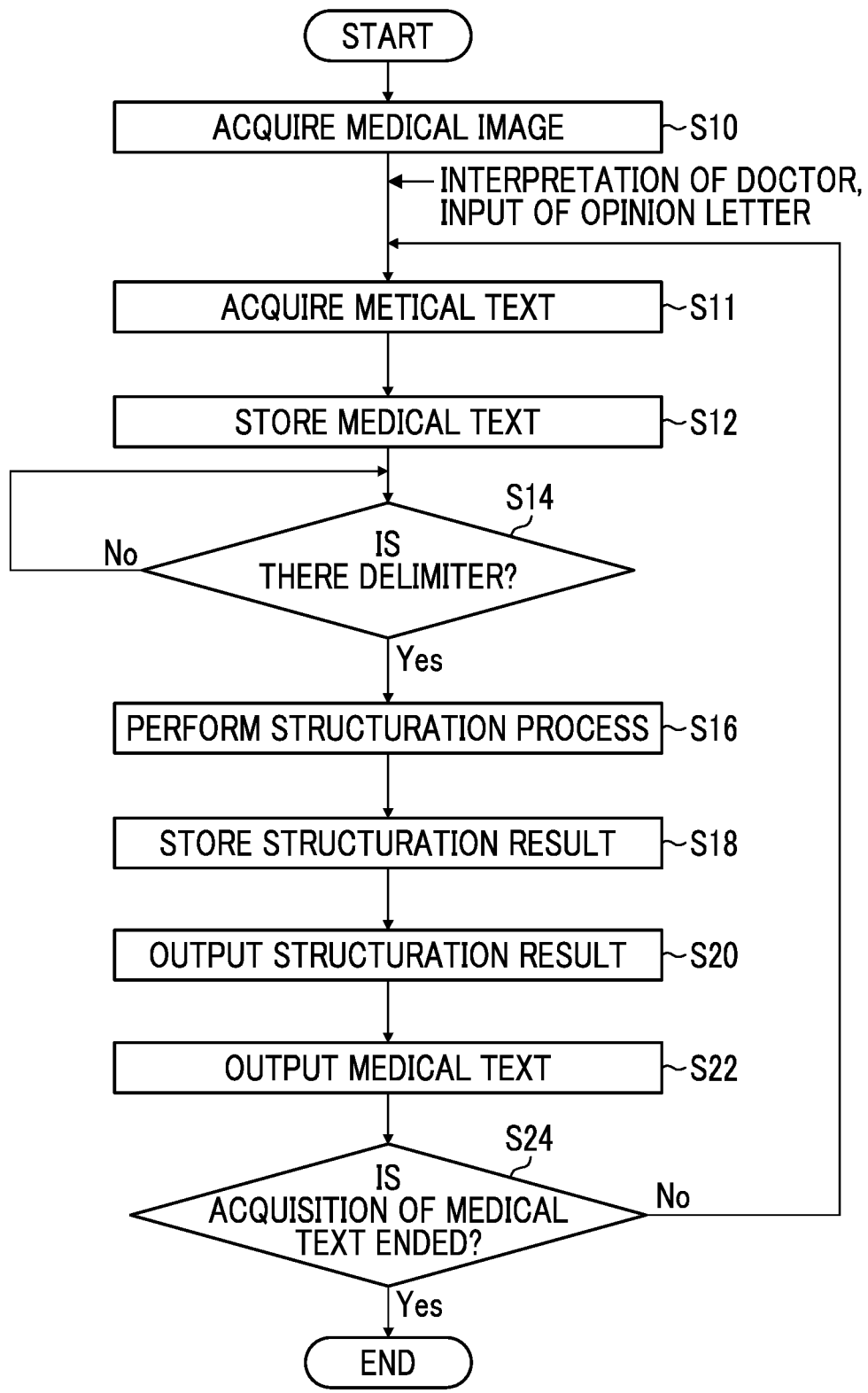
FIG. 4 is a flowchart illustrating a procedure of a structuration processing method according to the embodiment.

FIG. 4 is a flowchart illustrating a procedure of a structuration processing method according to the embodiment. The structuration processing method whose procedure is illustrated in FIG. 4 is applied to a case in which the medical information processing device 10 acquires the opinion letter input by the doctor after the doctor interprets the medical image acquired by the medical information processing device 10 illustrated in FIG. 1 and finds a lesion in a medical image acquisition step S10. In addition, the structuration processing method whose procedure is illustrated in FIG. 4 is an example of a method for operating a medical information processing device that performs various types of processes using each unit of the medical information processing device 10 which is a computer.

In a medical text acquisition step S11, the medical text acquisition unit 12 illustrated in FIG. 1 acquires the opinion letter input by the doctor as the medical text. In the medical text acquisition step S11, a portion of the opinion letter that has already been input during the input of the opinion letter may be acquired. After the medical text acquisition step S11, the process proceeds to a medical text storage step S12.

In the medical text storage step S12, the medical text processing unit 14 stores the opinion letter acquired in the medical text acquisition step S11 in the medical text storage unit 16. The storage of the opinion letter in the medical text storage unit 16 is performed for each unit of the opinion letter in which the opinion letter is acquired. After the medical text storage step S12, the process proceeds to a delimiter monitoring step S14.

In the delimiter monitoring step S14, the delimiter monitoring unit 20 monitors the delimiter of the opinion letter acquired in the medical text acquisition step S11. For example, in the delimiter monitoring step S14, organ recognition can be performed for each sentence of the opinion letter and the switching of the organs can be determined as the delimiter of the opinion letter.

In the delimiter monitoring step S14, in a case in which the delimiter monitoring unit 20 does not find the delimiter of the opinion letter, the determination result is "No". In a case in which the determination result is "No", the delimiter monitoring step S14 is continued until the determination result is "Yes" in the delimiter monitoring step S14.

On the other hand, in the delimiter monitoring step S14, in a case in which the delimiter monitoring unit 20 finds the delimiter of the opinion letter, the determination result is "Yes". In a case in which the determination result is "Yes", the process proceeds to a structuration processing step S16. In the delimiter monitoring step S14, the delimiter of the opinion letter determined by the delimiter monitoring unit 20 is stored as delimiter information in the delimiter information storage unit 22.

In the structuration processing step S16, the structuration processing unit 24 performs the structuration process for each unit of the opinion letter that is delimited by the delimiter specified in the delimiter monitoring step S14. After the structuration processing step S16, the process proceeds to a structuration result storage step S18.

In the structuration result storage step S18, the structuration processing unit 24 stores the result of the structuration process for the opinion letter in the structuration processing step S16 in the structuration result storage unit 26. After the structuration result storage step S18, the process proceeds to a structuration result output step S20.

In the structuration result output step S20, the structuration result output unit 28 outputs the result of the structuration process for the opinion letter performed in the structuration processing step S16. In the structuration result output step S20, an aspect in which the result of the structuration process for the opinion letter is displayed by the display unit 30 can be implemented. After the structuration result output step S20, the process proceeds to a medical text output step S22.

In the medical text output step S22, the medical text output unit 18 outputs the opinion letter which has been acquired in the medical text acquisition step S11 and subjected to the predetermined process by the medical text processing unit 14. In the medical text output step S22, an aspect in which the opinion letter is displayed by the display unit 30 can be implemented.

In addition, the structuration result output step S20 and the medical text output step S22 may be swapped in order or may be performed in parallel. After the structuration result output step S20 and the medical text output step S22 are performed, the process proceeds to a medical text acquisition end determination step S24.

In the medical text acquisition end determination step S24, the medical text acquisition unit 12 determines whether or not the acquisition of the medical text is ended. In the medical text acquisition end determination step S24, in a case in which the medical text acquisition unit 12 determines that the acquisition of the medical text is continued, the determination result is "No". In a case in which the determination result is "No", the process proceeds to the medical text acquisition step S11, and each step from the medical text acquisition step S11 to the medical text acquisition end determination step S24 is repeatedly performed until the determination result is "Yes" in the medical text acquisition end determination step S24.

On the other hand, in the medical text acquisition end determination step S24, in a case in which the medical text acquisition unit 12 determines that the acquisition of the medical text is ended, the determination result is "Yes". In a case in which the determination result is "Yes", the structuration processing method is ended.

Example of Configuration of Display Screen

Figure 5:
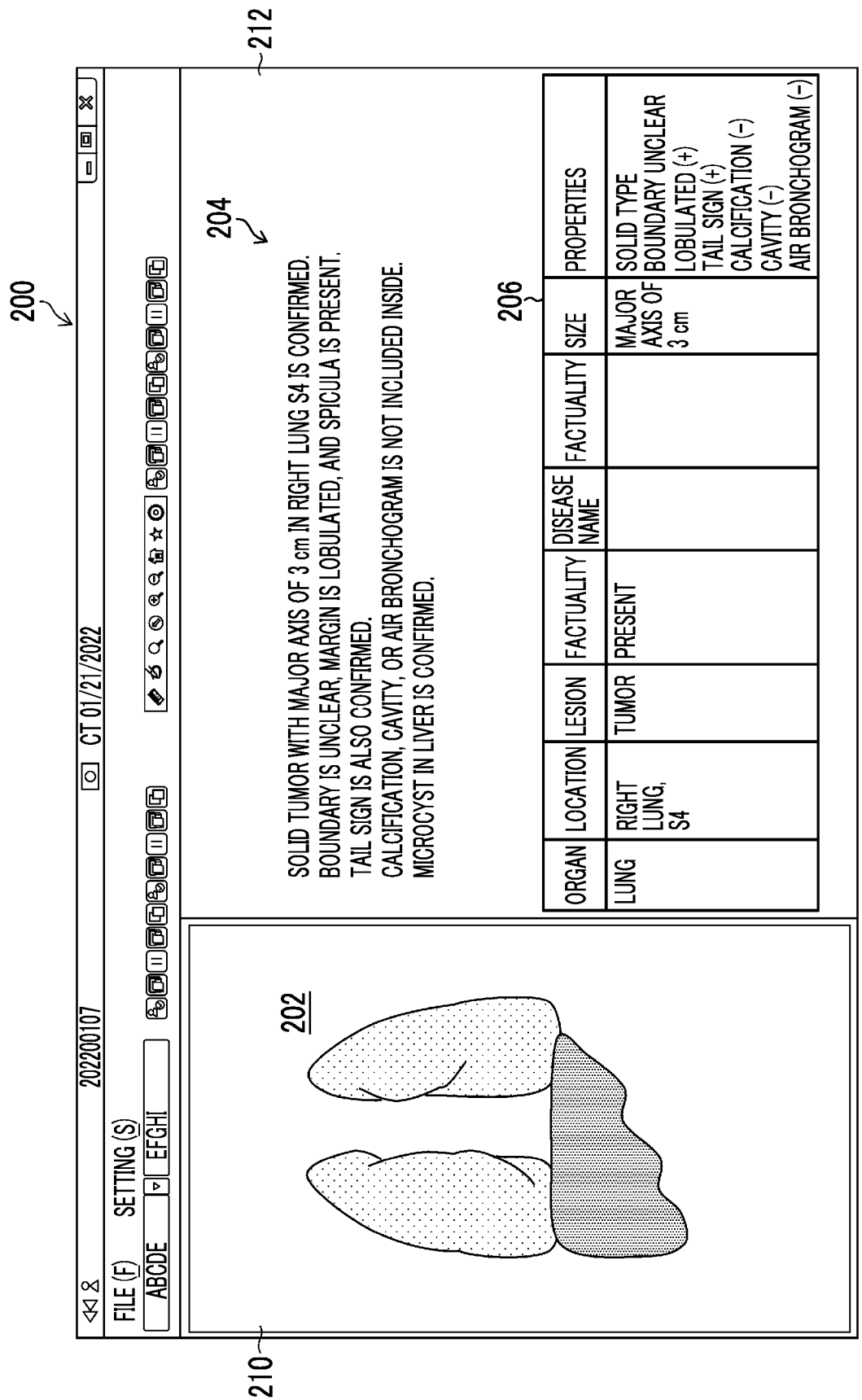
FIG. 5 is a configuration diagram illustrating a display screen applied to the medical information processing device illustrated in FIG. 1.

FIG. 5 is a diagram illustrating a configuration of a display screen applied to the medical information processing device illustrated in FIG. 1. A display screen 200 illustrated in FIG. 5 is displayed on the display unit 30 illustrated in FIG. 1 in a case in which a medical image 202 is acquired and the doctor interprets the medical image 202 and creates an opinion letter 204.

The display screen 200 includes a medical image display portion 210 in which the medical image 202 is displayed and a text display portion 212 in which the opinion letter 204 and a structuration process result 206 are displayed. In addition, the configuration of the display screen 200 illustrated in FIG. 5 is an example and can be appropriately changed, added, and deleted.

Specific Example of Structuration Process

Figure 6:
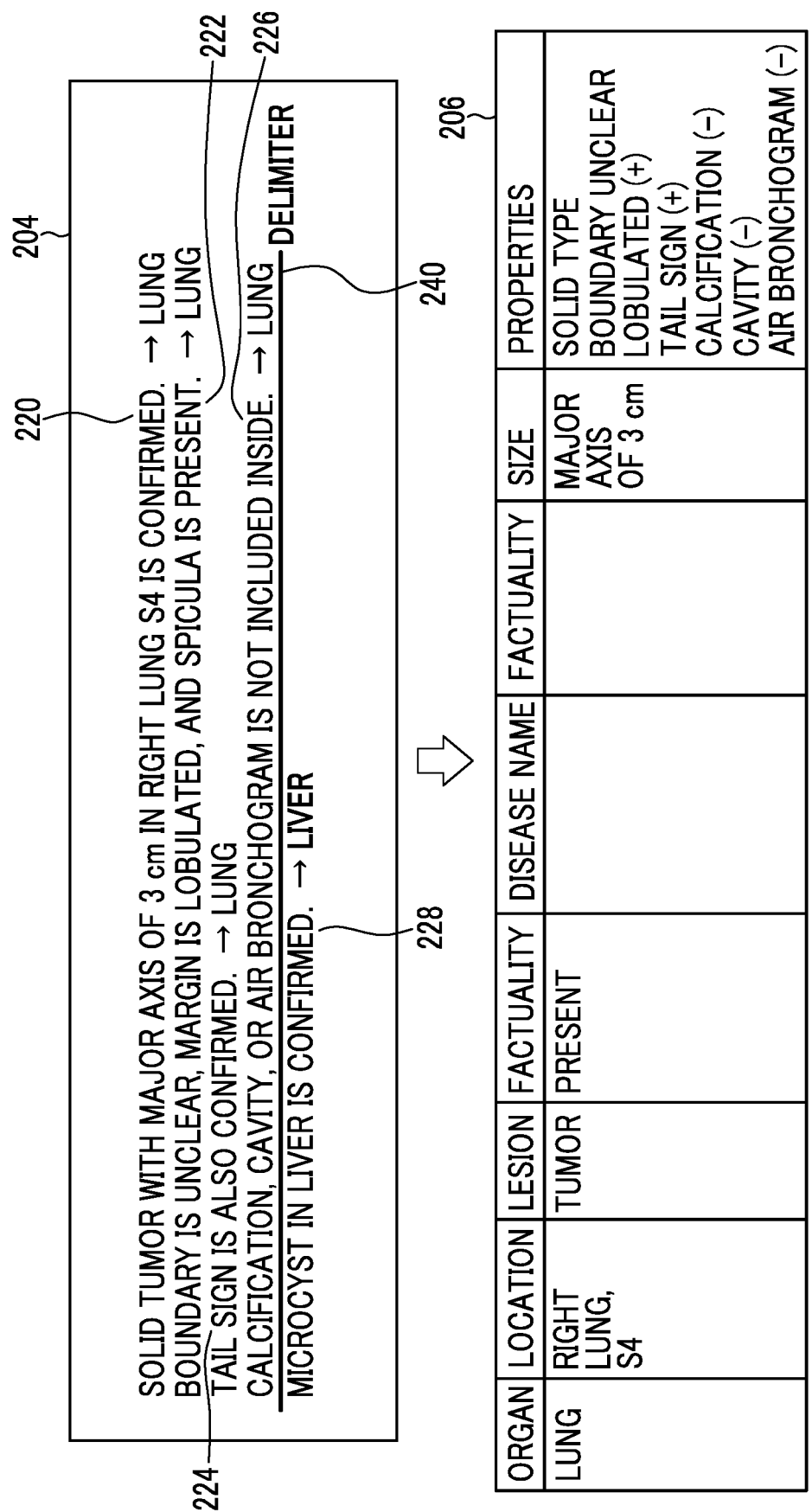
FIG. 6 is a diagram illustrating a structuration process applied to the medical information processing device illustrated in FIG. 1.

FIG. 6 is a diagram illustrating the structuration process applied to the medical information processing device illustrated in FIG. 1. FIG. 6 schematically illustrates an example of the display of the opinion letter 204 and the structuration process result 206. In addition, a frame surrounding the opinion letter 204 illustrated in FIG. 6 is illustrated for convenience and is not displayed on the actual display screen 200. In addition, arrow lines and the names of the organs illustrated on the right side of the opinion letter 204 in FIG. 6 are also illustrated for convenience of explanation and are not displayed on the actual display screen 200.

First, in a case in which the doctor interprets the medical image and finds a lesion, the doctor inputs an opinion letter. The medical information processing device 10 illustrated in FIG. 1 acquires the opinion letter input by the doctor, performs organ recognition for each sentence, and determines the switching of the organ. FIG. 6 illustrates a case in which a first sentence 220, a second sentence 222, a third sentence 224, a fourth sentence 226, and a fifth sentence 228 are acquired, the result of the organ recognition for the first sentence to the fourth sentence shows the lung, and the result of the organ recognition for the fifth sentence shows the liver.

The medical information processing device 10 determines that the organ is switched between the fourth sentence 226 and the fifth sentence 228 on the basis of the result of the organ recognition for the fifth sentence 228 and defines a space between the fourth sentence 226 and the fifth sentence 228 as a delimiter 240.

That is, the medical information processing device 10 extracts the terms indicating the organs used in the sentences constituting the opinion letter 204 and groups the sentences constituting the opinion letter 204 for each organ. In other words, the medical information processing device 10 performs a relationship determination process of determining the relationship between the terms used in the sentences constituting the opinion letter 204 and groups the sentences constituting the opinion letter 204 on the basis of the relationship between the terms. In addition, the switching of the organ described in the embodiment is an example of the switching of a part of the human body.

In a case in which the delimiter 240 is defined, the structuration process is performed for a paragraph of sentences including the first sentence 220 to the fourth sentence 226. FIG. 6 illustrates an example of the structuration process that classifies the terms used in the opinion letter 204 for an organ name, a location in the organ, a lesion name, the factuality of the lesion, a disease name, the factuality of the disease name, the size of the lesion, and properties.

In a case in which the result of the structuration process for a paragraph of sentences, which is the unit of processing of the structuration process, is derived, the structuration process result 206 is displayed. FIG. 6 illustrates the result of the structuration process for the lung described in the first sentence 220 to the fourth sentence 226. In addition, a line segment indicating the delimiter 240 illustrated in FIG. 6 is illustrated for convenience of explanation and is not displayed on the actual display screen 200. This holds for the delimiter 240 in the drawings after FIG. 7.

Figure 7:
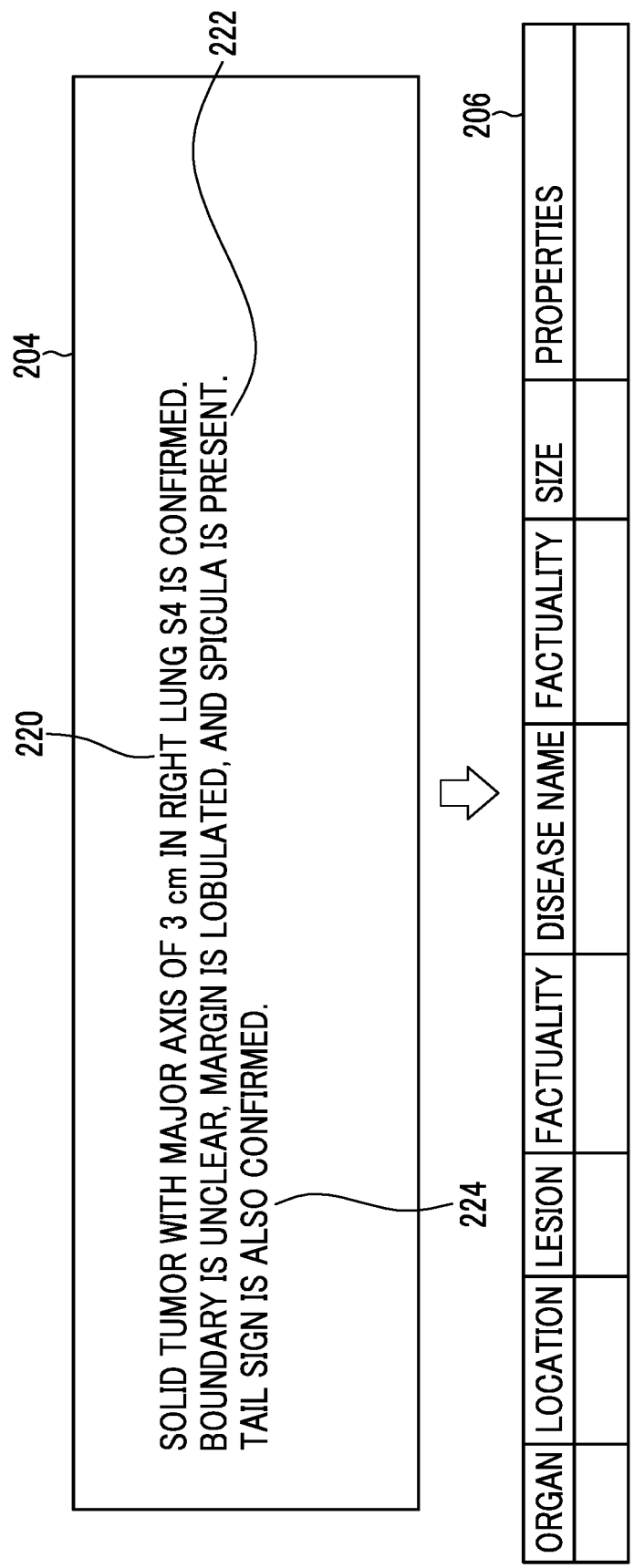
FIG. 7 is a schematic diagram illustrating an example of display during the input of an opinion letter.

FIG. 7 is a schematic diagram illustrating an example of display during the input of the opinion letter. FIG. 7 illustrates the opinion letter 204 in which the first sentence 220, the second sentence 222, and the third sentence 224 have been input. In a case in which the opinion letter 204 illustrated in FIG. 7 is displayed, it is not determined that the organ is switched, the delimiter is not defined, the structuration process is not performed, and the structuration process result 206 is not displayed. In addition, FIG. 7 illustrates a table in which each item is blank as an aspect in which the structuration process result 206 is not displayed.

Figure 8:
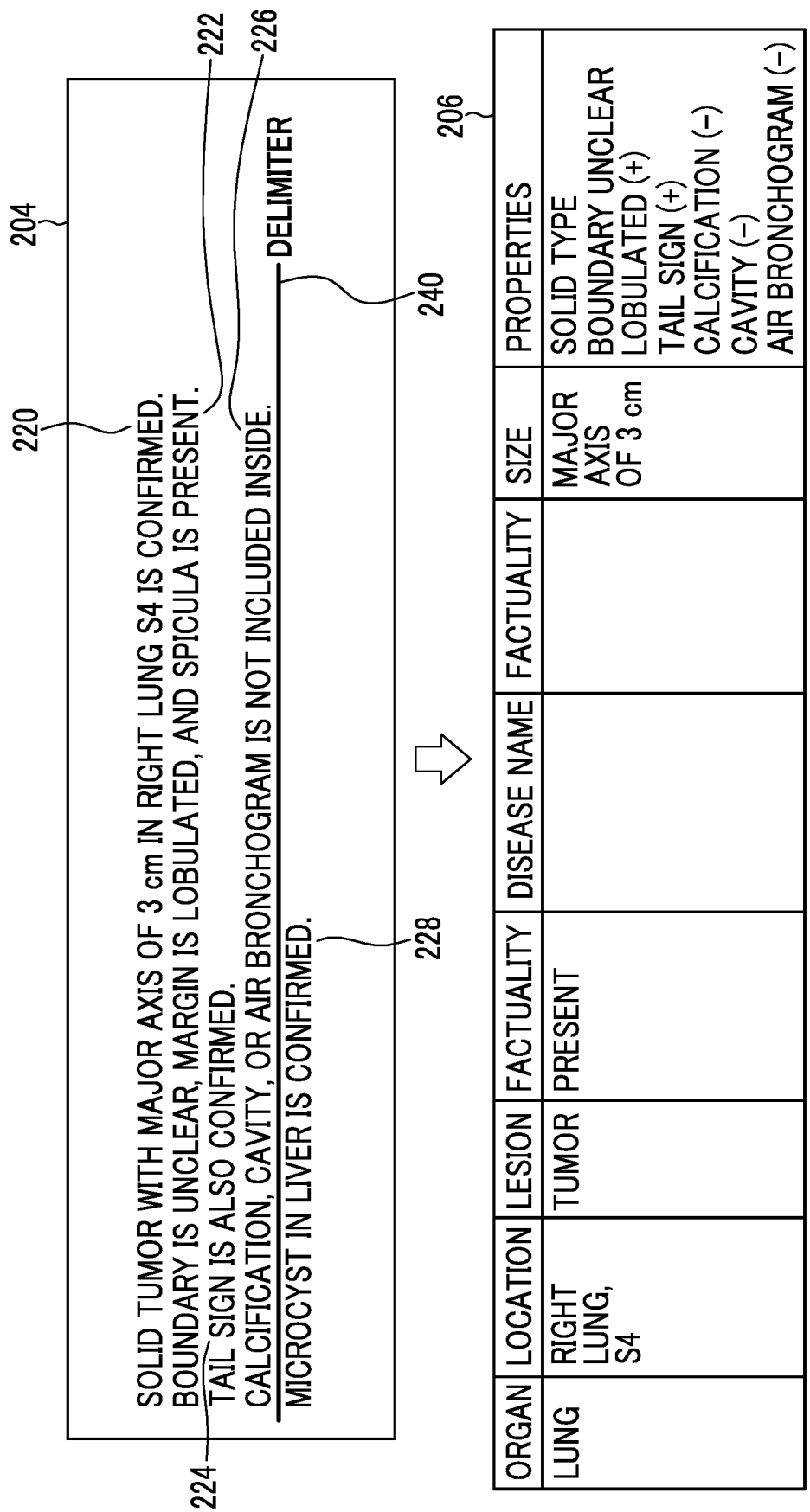
FIG. 8 is a schematic diagram illustrating an example of a display screen in a case in which a delimiter is detected.

FIG. 8 is a schematic diagram illustrating an example of the display screen in a case in which the delimiter is detected. FIG. 8 illustrates the opinion letter 204 in a case in which the fifth sentence 228 is input, it is determined that the organ is switched between the fourth sentence 226 and the fifth sentence 228, and the delimiter 240 is defined between the fourth sentence 226 and the fifth sentence 228. In a case in which the opinion letter 204 illustrated in FIG. 8 is displayed, the structuration process result 206 for the sentence related to the lung is displayed.

Figure 9:
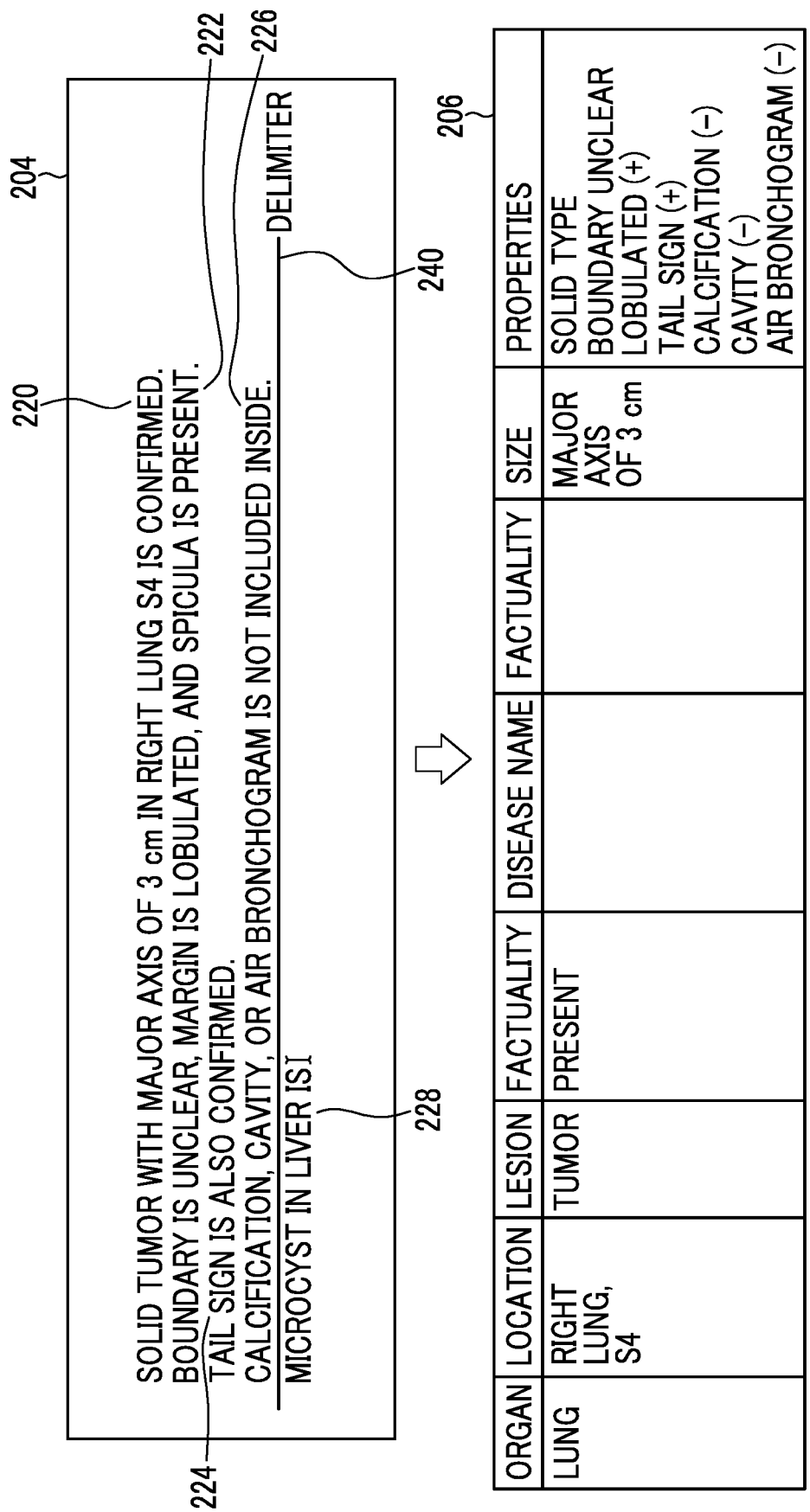
FIG. 9 is a schematic diagram illustrating an example of display in a case in which the delimiter is detected during the input of a sentence.

FIG. 9 is a schematic diagram illustrating an example of display in a case in which the delimiter is detected during the input of a sentence. FIG. 9 illustrates the opinion letter 204 in a case in which it is determined that the organ is switched during the input of the fifth sentence 228 and the delimiter 240 is defined between the fourth sentence 226 and the fifth sentence 228 during the input of the fifth sentence 228. In a case in which the delimiter 240 is defined during the input of the fifth sentence 228, the structuration process is performed during the input of the fifth sentence 228, and the structuration process result 206 is displayed.

Modification Examples of Structuration Process

In a structuration process according to a modification example, a provisional structuration process result 206A, which is a provisional result of the structuration process, is displayed until the switching of the organ is determined, the delimiter 240 is defined, and the result of the structuration process is confirmed in a case in which the medical text to be subjected to the structuration process is confirmed.

Figure 10:
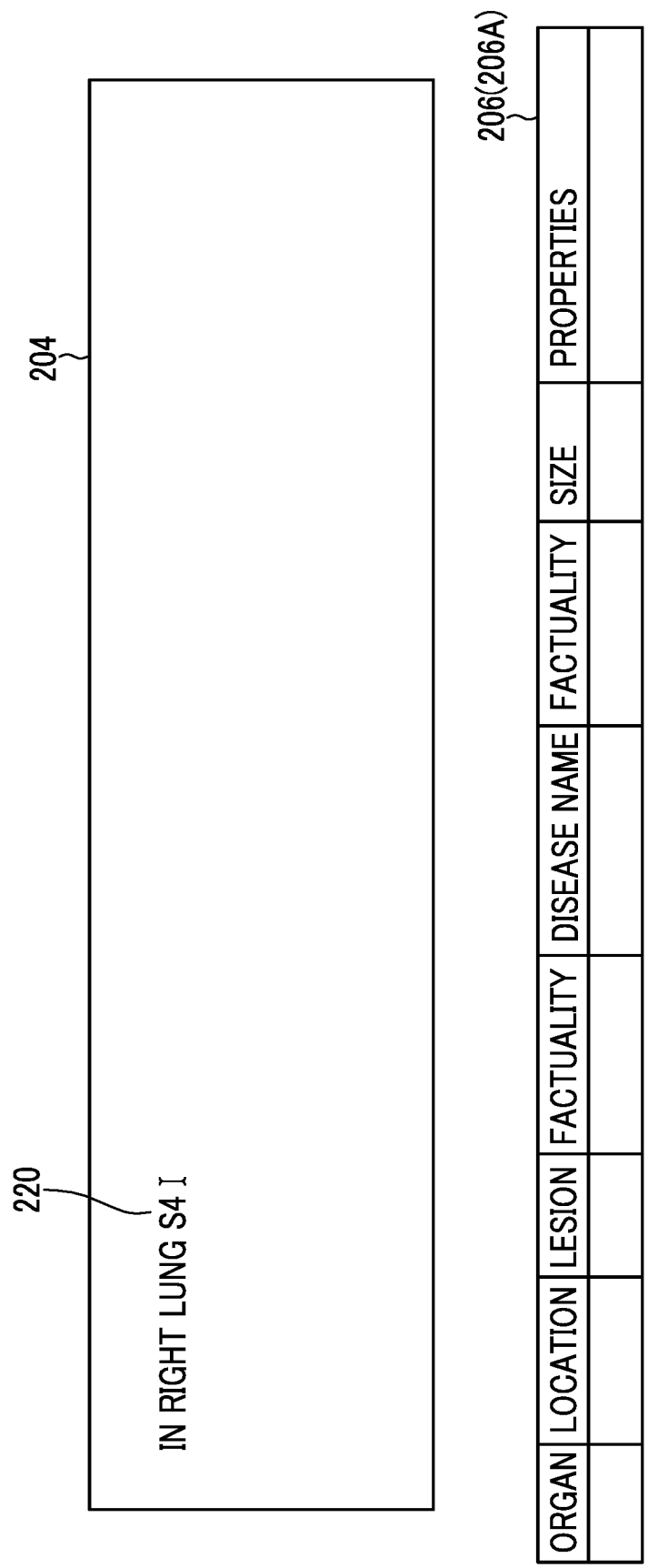
FIG. 10 is a schematic diagram illustrating an example of display applied to a structuration process according to a modification example.

FIG. 10 is a schematic diagram illustrating an example of display applied to the structuration process according to the modification example. FIG. 10 illustrates the opinion letter 204 in which the first sentence 220 is input halfway. While the first sentence 220 is being input until the punctuation mark of the first sentence 220 is input and the first sentence 220 is confirmed, the structuration process is not performed for the first sentence 220, and the structuration process result 206 and the provisional structuration process result 206A are not displayed.

Figure 11:
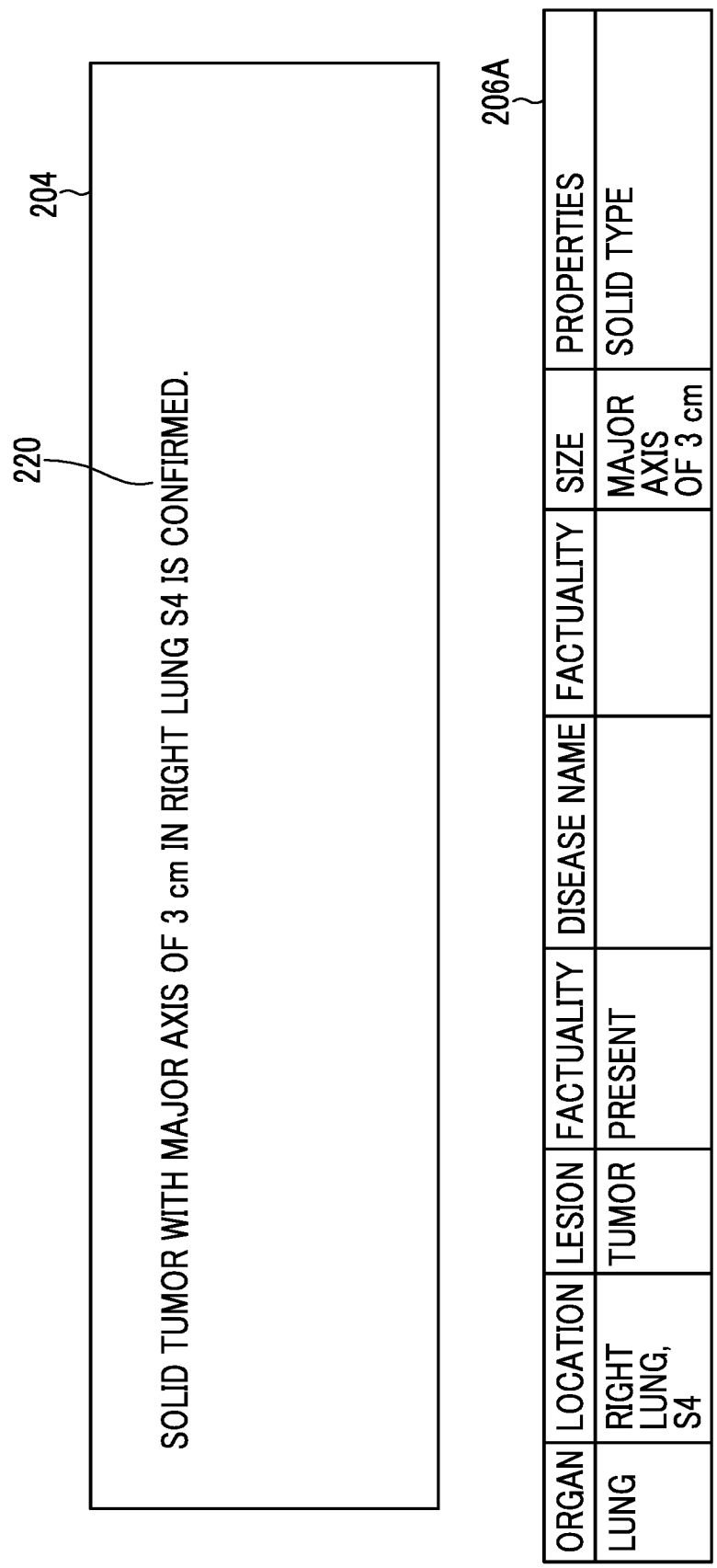
FIG. 11 is a schematic diagram illustrating an example of the display of a provisional result of the structuration process.

FIG. 11 is a schematic diagram illustrating an example of the display of the provisional result of the structuration process. FIG. 11 illustrates a case in which the first sentence 220 is confirmed, the structuration process is performed for the first sentence 220, and the provisional structuration process result 206A for the first sentence 220 is displayed.

Figure 12:
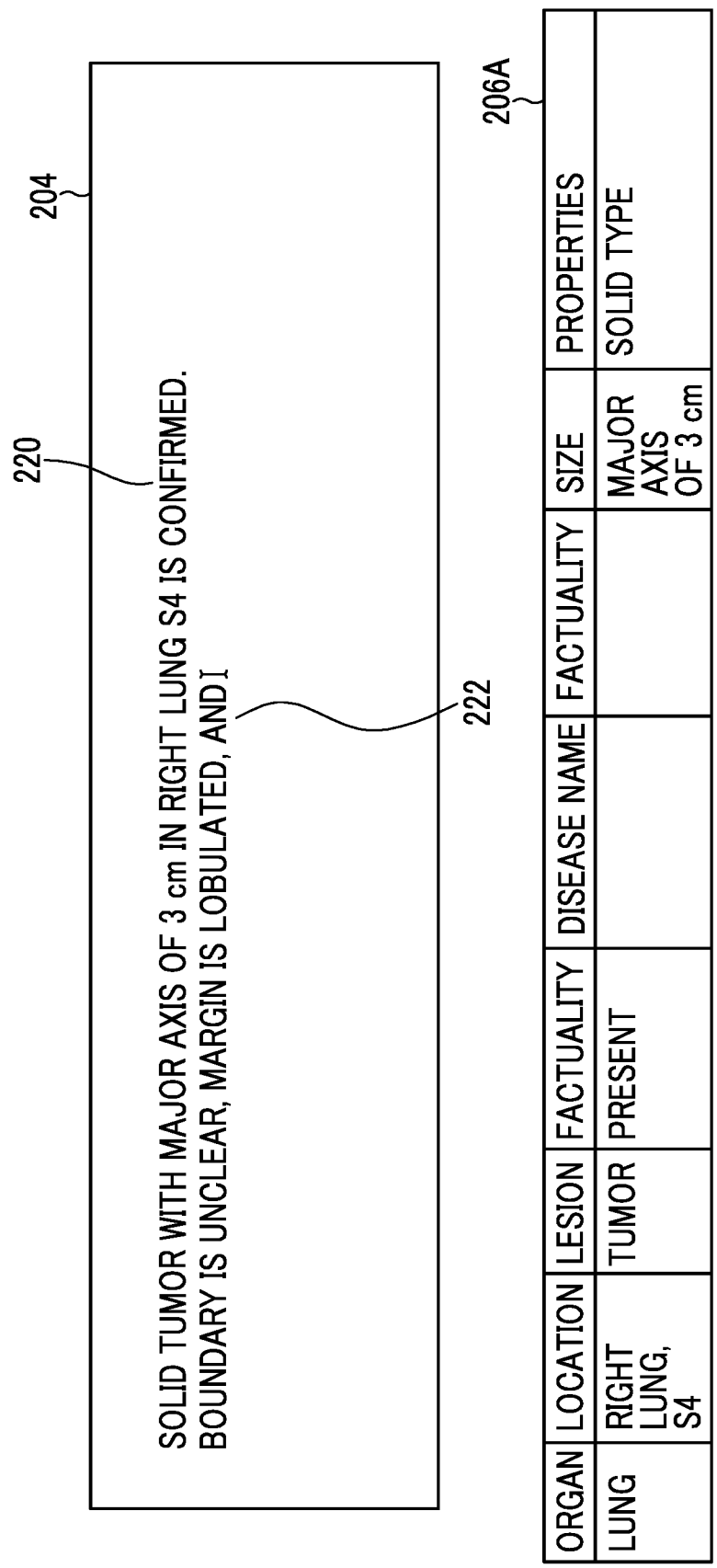
FIG. 12 is a schematic diagram illustrating an example of display in a state in which the input of the opinion letter illustrated in FIG. 11 is progressing.

FIG. 12 is a schematic diagram illustrating an example of display in a state in which the input of the opinion letter illustrated in FIG. 11 is progressing. FIG. 12 illustrates the opinion letter 204 in which the second sentence 222 is input halfway. While the second sentence 222 is being input until the punctuation mark of the second sentence 222 is input and the second sentence 222 is confirmed, the structuration process is not performed for the second sentence 222, and the display of the provisional structuration process result 206A for the first sentence 220 is continued.

Figure 13:
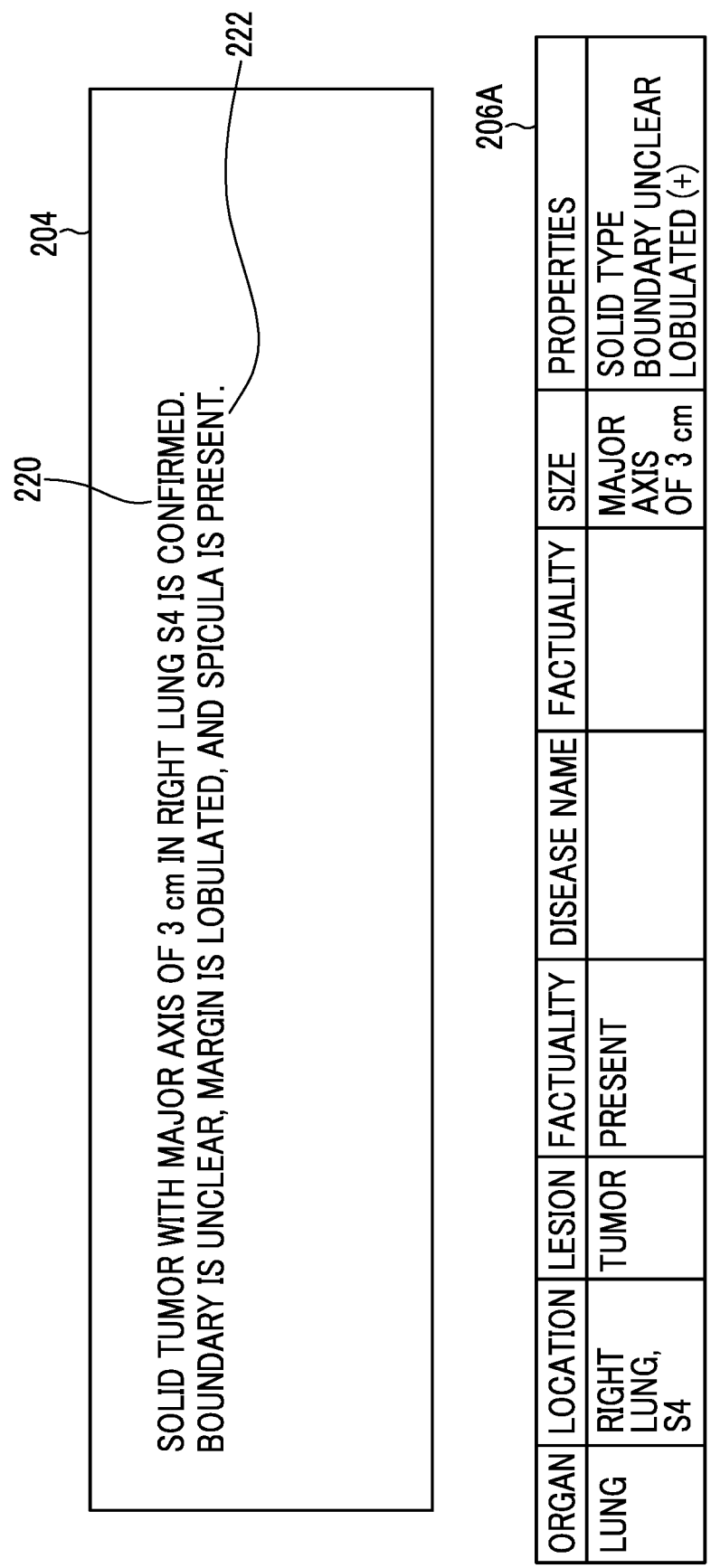
FIG. 13 is a schematic diagram illustrating an example of display in a case in which the provisional result of the structuration process is updated.

FIG. 13 is a schematic diagram illustrating an example of display in a case in which the provisional result of the structuration process is updated. FIG. 13 illustrates a case in which the second sentence 222 is confirmed, the structuration process is performed for the second sentence 222, and the provisional structuration process result 206A is updated. In the provisional structuration process result 206A illustrated in FIG. 13, the result of the structuration process for the second sentence 222 is added to the property field.

Figure 14:
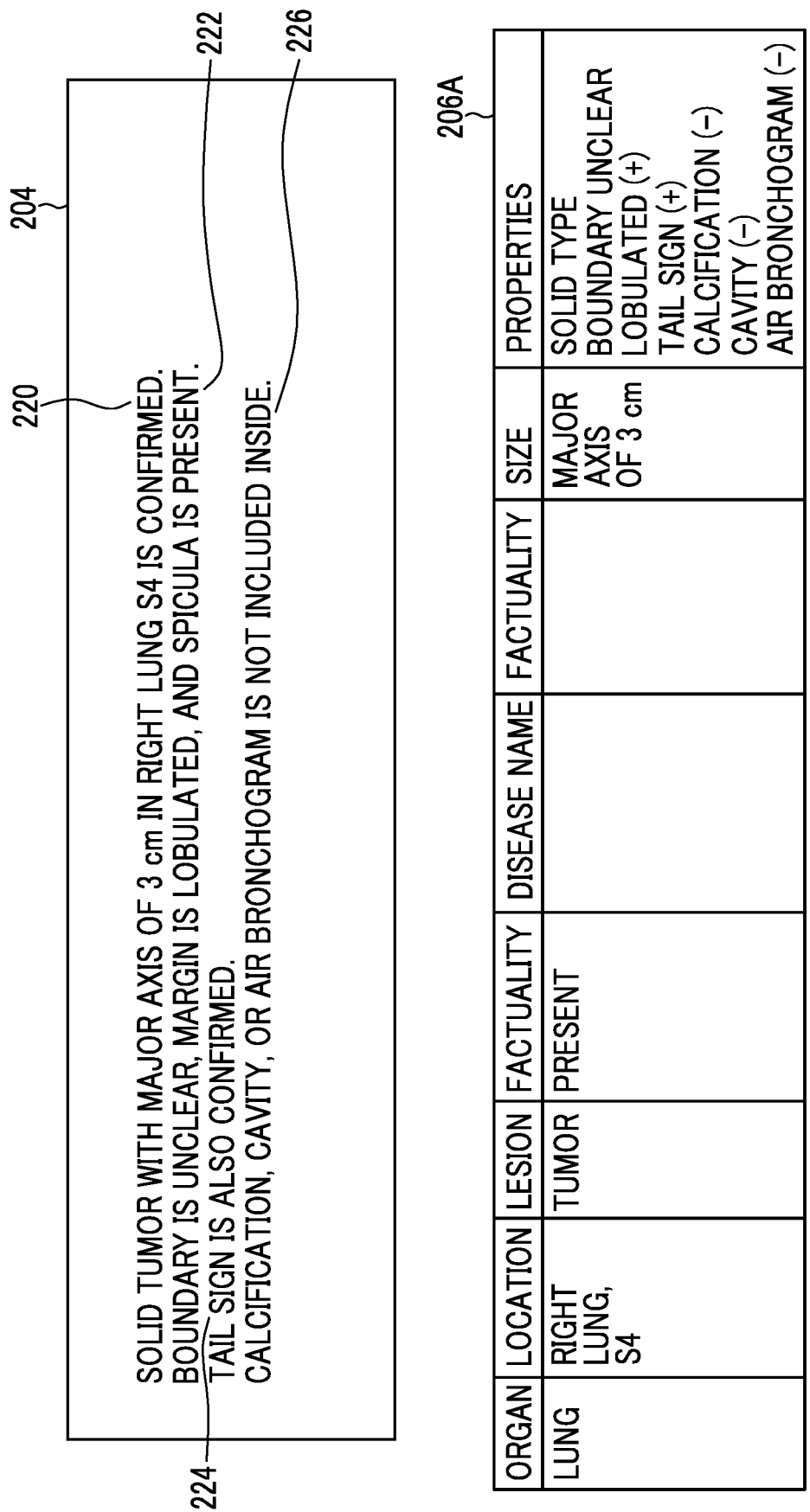
FIG. 14 is a schematic diagram illustrating an example of display in a state in which the input of the opinion letter illustrated in FIG. 13 is progressing.

FIG. 14 is a schematic diagram illustrating an example of display in a state in which the input of the opinion letter illustrated in FIG. 13 is progressing. In FIG. 14, the third sentence 224 and the fourth sentence 226 are confirmed, the structuration process is performed for the third sentence 224 and the fourth sentence 226, and the provisional structuration process result 206A to which the result of the structuration process for the third sentence 224 and the result of the structuration process for the fourth sentence 226 are added. In the provisional structuration process result 206A illustrated in FIG. 14, the results of the structuration process for the third sentence 224 and the fourth sentence 226 are added to the property field.

FIG. 15 is a schematic diagram illustrating an example of display in a case in which the delimiter is detected. FIG. 15 illustrates the opinion letter 204 in a case in which it is determined that the organ is switched during the input of the fifth sentence 228 and the delimiter 240 is defined.

In a case in which the delimiter 240 is defined, the structuration process result 206 for the first sentence 220 to the fourth sentence 226 is confirmed. FIG. 15 illustrates a display aspect of the structuration process result 206 indicating that the structuration process result 206 has been confirmed.

For example, in a case in which the structuration process result 206 has been confirmed, the color applied to the provisional structuration process result 206A may be changed in the structuration process result 206. For example, the font and the size may be changed instead of or in addition to the change of the color.

Modification Example of Display of Opinion Letter

Figure 16:
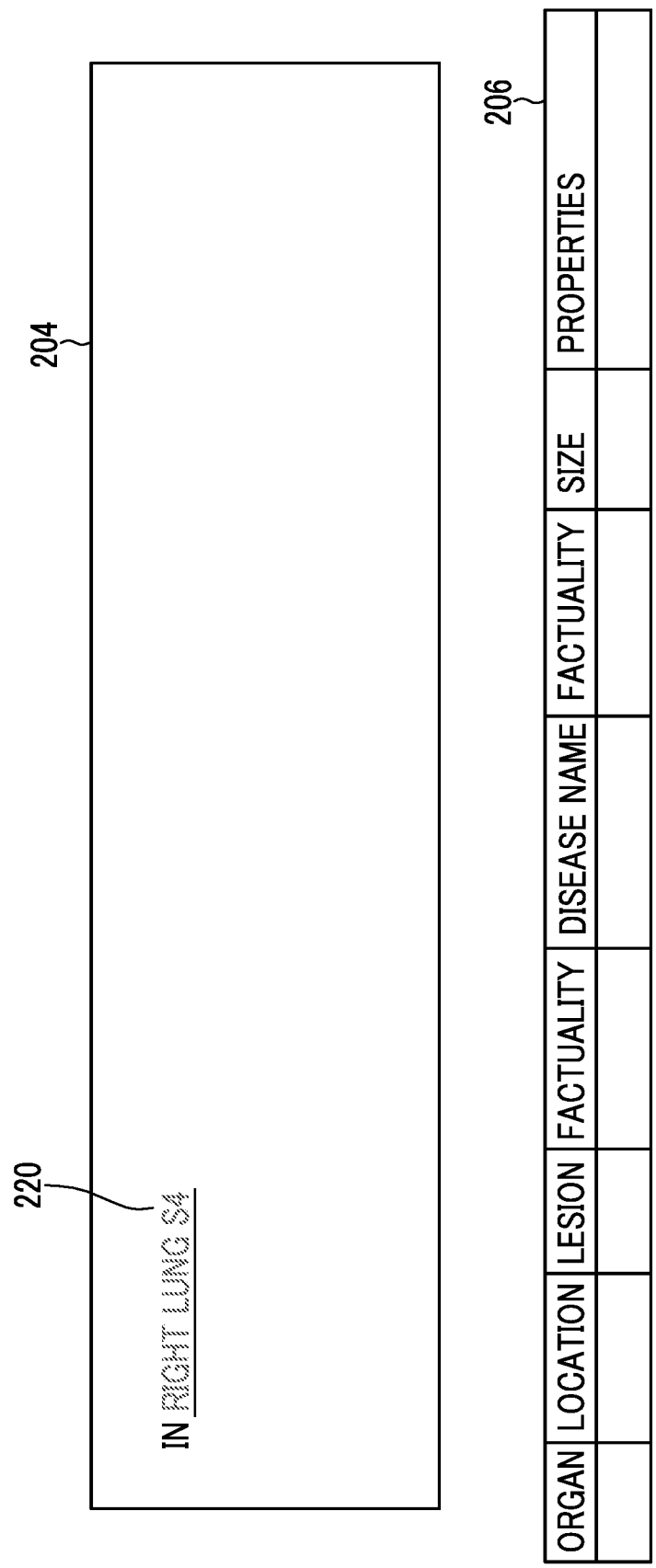
FIG. 16 is a schematic diagram illustrating an example of the display of an opinion letter according to a modification example.

FIG. 16 is a schematic diagram illustrating an example of the display of an opinion letter according to a modification example. FIG. 16 illustrates a case in which a right lung S4 is extracted as a result of a term extraction process in the opinion letter 204 in which the first sentence 220 is being input and the letters "right lung S4" are given a red color indicating an organ and a location. In addition, a solid underline attached to the right lung S4 indicates that the letters "right lung S4" are given a red color.

Figure 17:
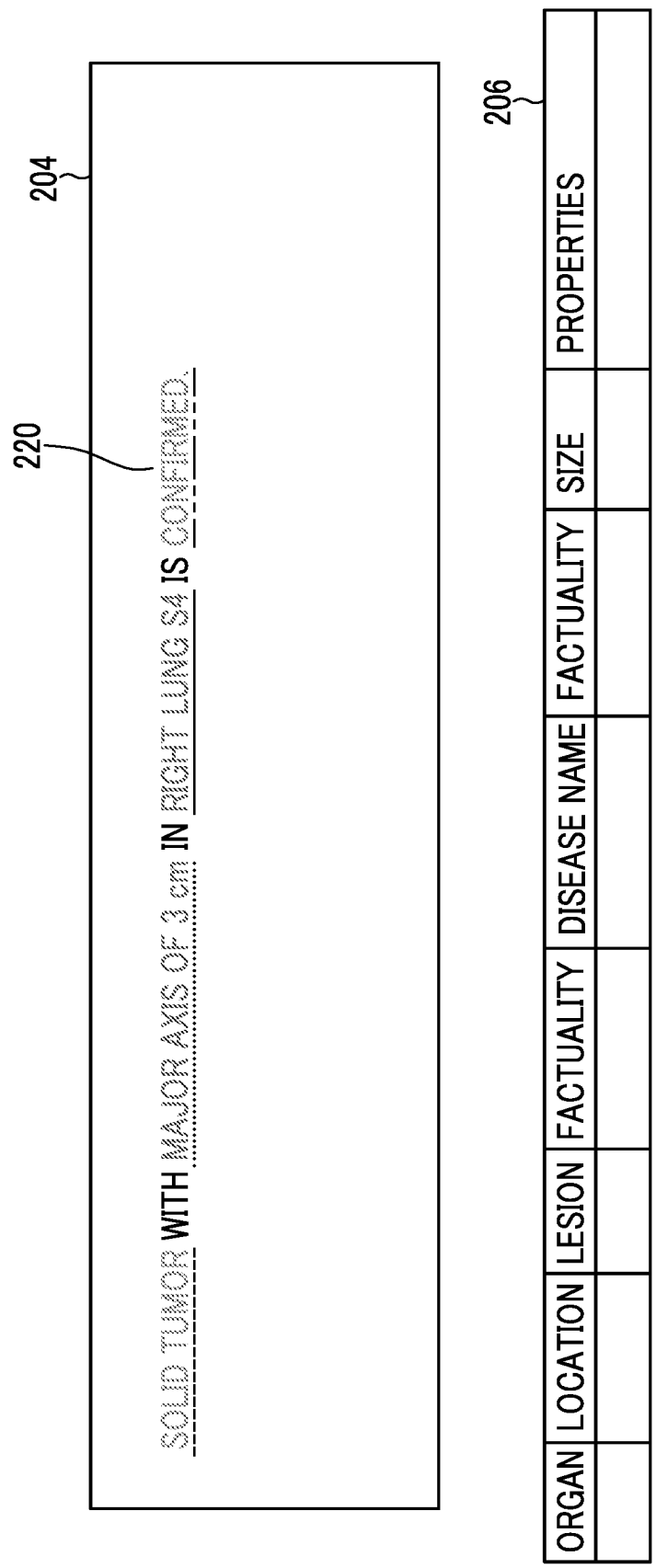
FIG. 17 is a schematic diagram illustrating an example of display in a state in which the input of the opinion letter illustrated in FIG. 16 is progressing.

FIG. 17 is a schematic diagram illustrating an example of display in a state in which the input of the opinion letter illustrated in FIG. 16 is progressing. FIG. 17 illustrates a state in which the input of the first sentence 220 has ended. FIG. 17 illustrates a case in which the terms "major axis of 3 cm", "solid tumor", and "confirmed" are extracted as a result of the term extraction process for the first sentence 220.

FIG. 17 illustrates a case in which a blue color indicating a size is given to the term "major axis of 3 cm", a green color indicating a lesion is given to the term "solid tumor," and an orange color indicating factuality is given to the term "confirmed".

In addition, a dotted underline attached to the major axis of 3 cm indicates that the letters "major axis of 3 cm" are given a blue color and a dashed underline attached to the solid tumor indicates that the letters "solid tumor" are given a green color. In addition, a two-dot chain underline attached to the letters "confirmed" indicates that the letters "confirmed" are given an orange color.

Figure 18:
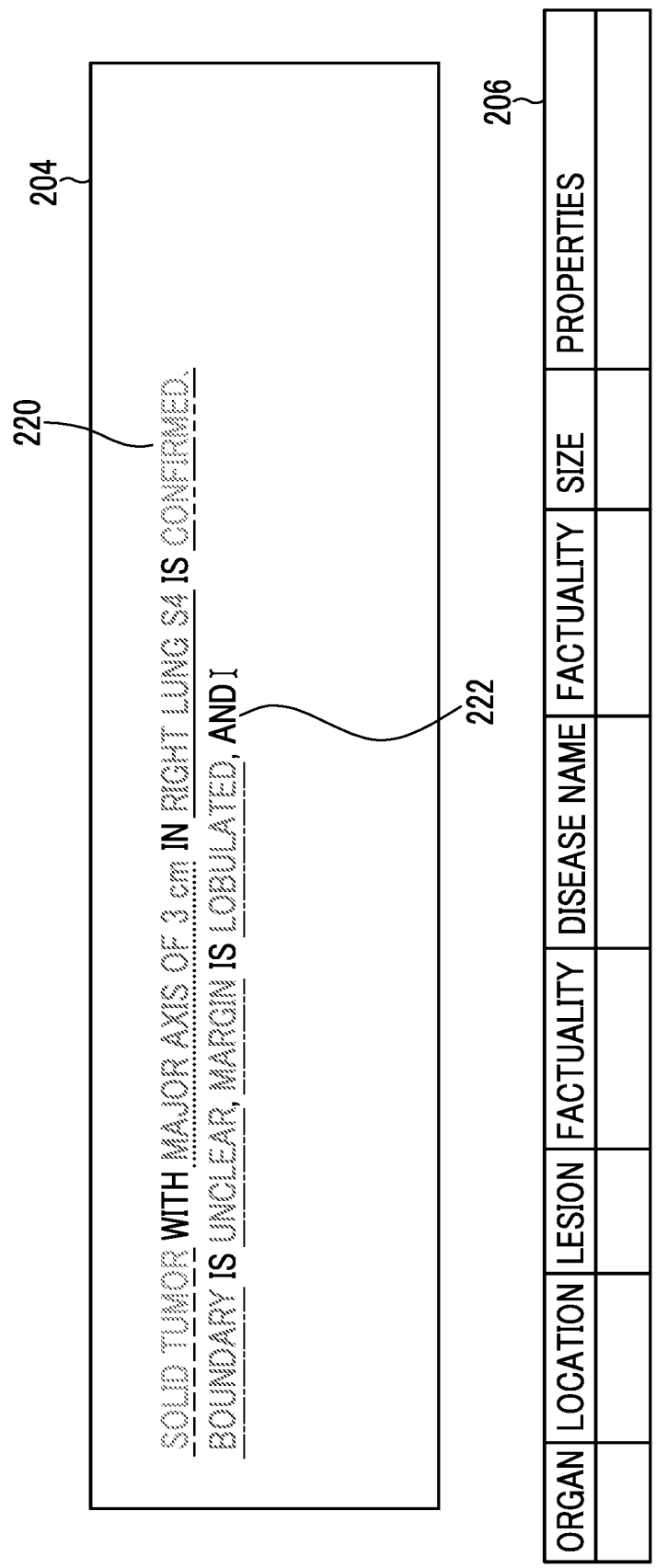
FIG. 18 is a schematic diagram illustrating an example of display in a state in which the input of the opinion letter illustrated in FIG. 17 is progressing.

FIG. 18 is a schematic diagram illustrating an example of display in a state in which the input of the opinion letter illustrated in FIG. 17 is progressing. FIG. 18 illustrates a case in which the terms "boundary", "unclear", "margin", and "lobulated" are extracted as a result of the term extraction process for the second sentence 222 in the opinion letter 204 in which the second sentence 222 is being input.

FIG. 18 illustrates the opinion letter 204 in which the terms "boundary", "unclear", "margin", and "lobulated" are given a purple color indicating properties. In addition, a one-dot chain underline attached to the boundary and the like indicates that a purple color is given to the boundary and the like.

Figure 19:
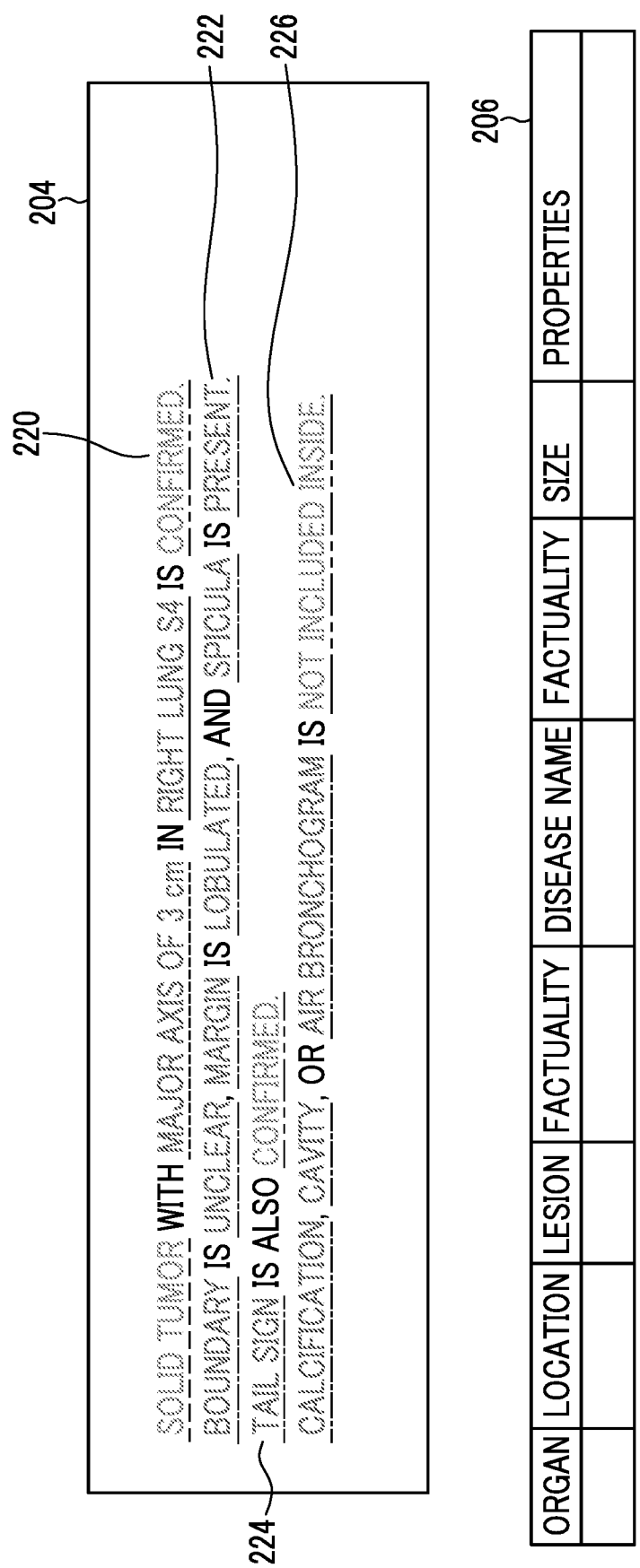
FIG. 19 is a schematic diagram illustrating an example of display in a state in which the input of the opinion letter illustrated in FIG. 18 is progressing.

FIG. 19 is a schematic diagram illustrating an example of display in a state in which the input of the opinion letter illustrated in FIG. 18 is progressing. FIG. 19 illustrates a state in which the input of the first sentence 220 to the fourth sentence 226 has ended. FIG. 19 illustrates a case in which the terms "tail sign" and "confirmed" are extracted as a result of the term extraction process for the third sentence 224. In addition, FIG. 19 illustrates a case in which the terms "inside", "calcification", "cavity", "air bronchogram", and "not included" are extracted as a result of the term extraction process for the fourth sentence 226.

FIG. 19 illustrates the opinion letter 204 in which the terms "inside", "calcification", "cavity", and "air bronchogram" are given a purple color indicating properties and the term "not included" is given an orange color indicating factuality.

FIG. 20 is a schematic diagram illustrating an example of display in a case in which the delimiter is defined. FIG. 20 illustrates the opinion letter 204 in a case in which the delimiter 240 is defined during the input of the fifth sentence 228. In FIG. 20, a line segment indicating the delimiter 240 is not illustrated. This holds for FIG. 21.

In the fifth sentence 228 illustrated in FIG. 20, the term "liver" is given a red color indicating an organ, and the term "microcyst" is given a green color indicating a lesion. Further, FIG. 20 illustrates a case in which the structuration process results 206 for the first sentence 220 to the fourth sentence 226 are confirmed and the structuration process results 206 for the first sentence 220 to the fourth sentence 226 related to the lung are displayed.

FIG. 21 is a schematic diagram illustrating another example of the display of the opinion letter in a case in which the structuration process is confirmed. FIG. 21 illustrates an example in which the colors of the first sentence 220 to the fourth sentence 226 for which the structuration process results 206 illustrated in FIG. 20 have been confirmed are returned to a black color.

The opinion letter 204 illustrated in FIG. 21 makes it easy to distinguish between the first sentence 220 to the fourth sentence 226 for which the structuration process results 206 have been confirmed and the fifth sentence 228 for which structuration process result 206 has not been confirmed.

Display of Confirmation of Structuration Process Using Change in Display Aspect of Opinion Letter FIG. 22 is a schematic diagram illustrating an example of display in a case in which the confirmation of the structuration process is indicated using a change in the display aspect of the opinion letter. The opinion letter 204 illustrated in FIG. 22 is changed from a black color, which is used in a case of input, to a blue color in a case in which the structuration process results 206 for the first sentence 220 to the fourth sentence 226 have been confirmed.

FIG. 22 illustrates a change in the color of the letters as an example of the change in the display aspect of the opinion letter 204. However, for example, a change in the size of the letters, a change in the font of the letters, and a highlighting process may be applied as the change in the display aspect of the opinion letter 204. In addition, for the change in the display aspect of the opinion letter 204, the change in the color of the letters, the change in the size of the letters, the change in the font of the letters, and the highlighting process may be appropriately combined.

The display aspect of the opinion letter illustrated in FIG. 22 makes it easy to distinguish between the first sentence 220 to the fourth sentence 226 for which the structuration process has been confirmed and the fifth sentence 228 for which the structuration process has not been confirmed.

Association Between Human Body Schema and Result of Structuration Process

FIG. 23 is a schematic diagram illustrating an example of the display of the result of the structuration process associated with the human body schema. FIG. 23 illustrates an aspect in which the opinion letter 204 and the structuration process result 206 are displayed and a human body schema 250 is displayed using the text display portion 212 illustrated in FIG. 5. In the human body schema 250 illustrated in FIG. 23, a lung 252, which is an organ to be subjected to the structuration process, is displayed in color.

Figure 24:
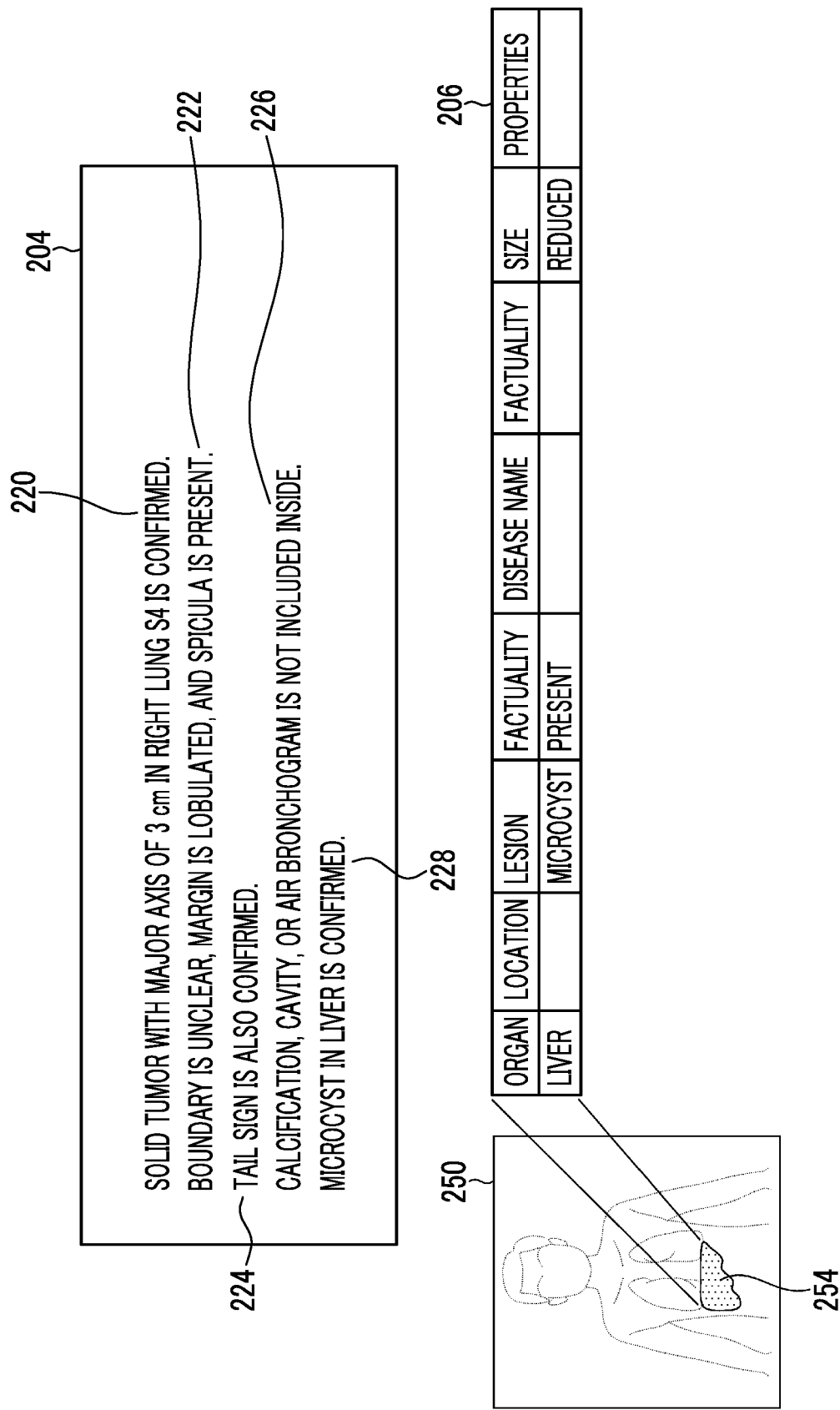
FIG. 24 is a schematic diagram illustrating another example of the display of the result of the structuration process associated with the human body schema.

FIG. 24 is a schematic diagram illustrating another example of the display of the result of the structuration process associated with the human body schema. FIG. 24 illustrates a case in which the fifth sentence 228 for the liver is confirmed, the structuration process for the fifth sentence 228 is performed, and the structuration process result 206 for the fifth sentence 228 is displayed. In a human body schema 250 illustrated in FIG. 24, a liver 254, which is an organ to be subjected to the structuration process, is displayed in color.

The structuration process results 206 for the first sentence 220 to the fourth sentence 226 for the lung illustrated in FIG. 23 and the structuration process result 206 for the fifth sentence 228 for the liver illustrated in FIG. 24 may be displayed on the same screen. In addition, the structuration process results 206 for the opinion letter 204 may be displayed for each organ designated in the human body schema 250.

The association between the human body schema 250 and the structuration process result 206 makes it possible to easily understand the organ for which the result of the structuration process is displayed using the human body schema 250.

Association with Past Examination

The medical information processing device 10 illustrated in FIG. 1 may acquire the past examination results from the electronic medical record system 104 illustrated in FIG. 3 and reflect the interpretation report and the result of the structuration process for the opinion letter included in the past examination results in a case in which an interpretation report for the current examination is created.

FIG. 25 is a schematic diagram illustrating an example of the opinion letter and the result of the structuration process in the past examination. FIG. 25 illustrates an opinion letter 204B and a structuration process result 206B included in the past examination results corresponding to the current examination.

FIG. 26 is a schematic diagram illustrating an example of a display screen on which the opinion letter is being input.

FIG. 26 illustrates a case in which the delimiter 240 is defined between a first sentence 260 and a second sentence 262, the structuration process is performed for the first sentence 260, and the structuration process result 206 is displayed.

Figure 27:
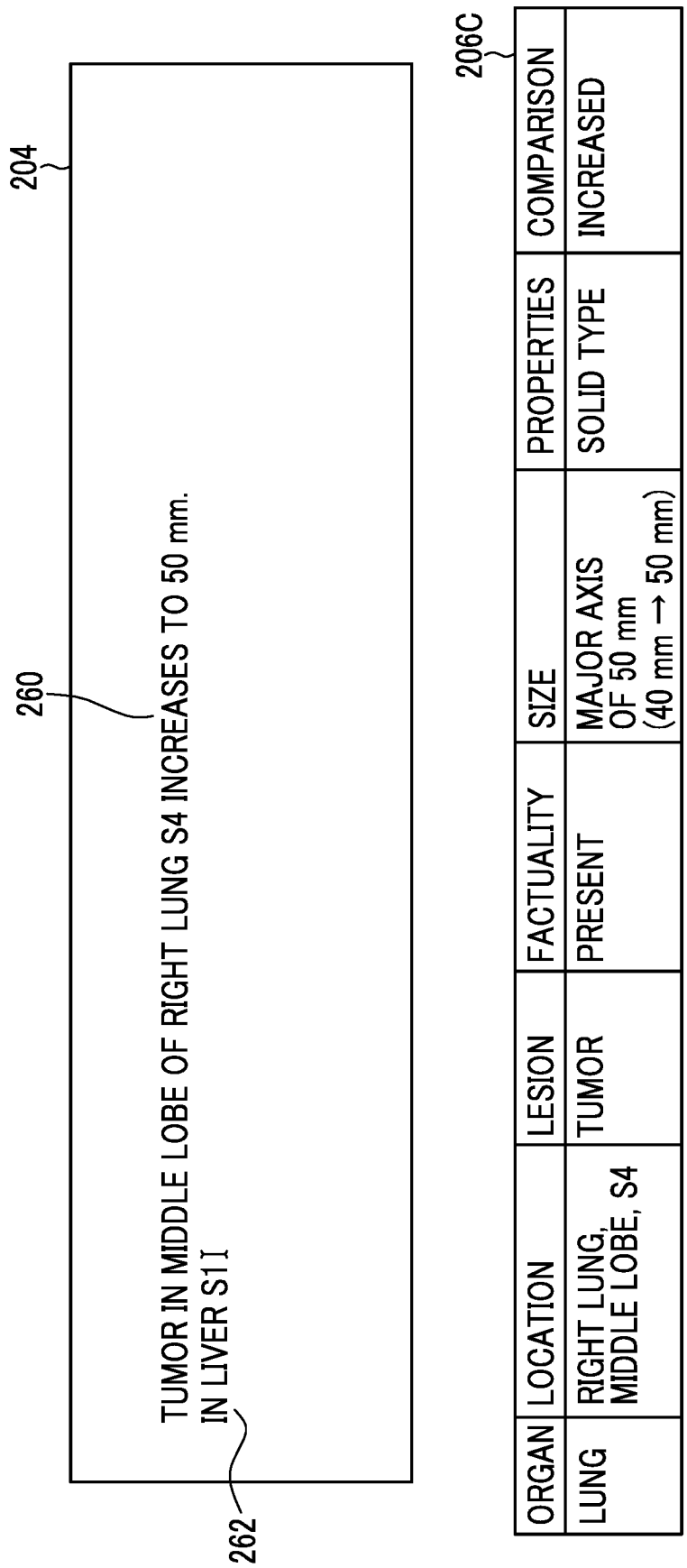
FIG. 27 is a schematic diagram illustrating an example of the display of the result of the structuration process associated with the past examination.

FIG. 27 is a schematic diagram illustrating an example of the display of the result of the structuration process associated with the past examination. FIG. 27 illustrates a structuration process result 206C in which the structuration process result 206B for the opinion letter 204B in the past examination illustrated in FIG. 25 is associated with the structuration process result 206 illustrated in FIG. 26.

The structuration process result 206C illustrated in FIG. 27 differs from the structuration process result 206 illustrated in FIG. 26 in that the right lung and the middle lobe are added as the information in the location field and information indicating an increase in the size of the tumor from 40 mm to 50 mm is added as the information in the size field.

In the structuration process result 206C associated with the structuration process result 206 which is included in the past examination results, the amount of information is increased as compared to the structuration process result 206 for the opinion letter 204 in the current examination.

Example of Display Corresponding to Correction of Opinion Letter

Figure 28:
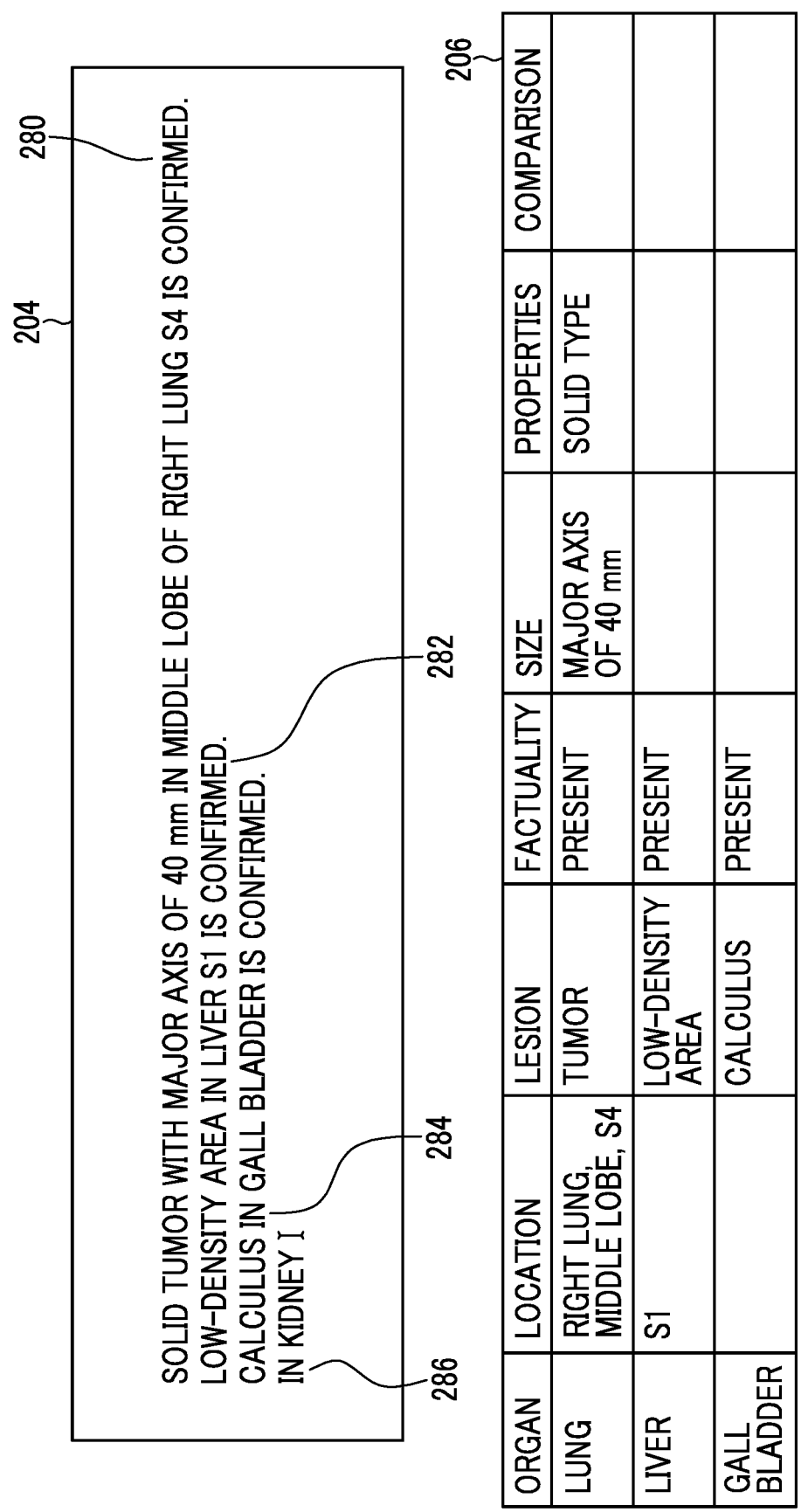
FIG. 28 is a schematic diagram illustrating an example of display before the opinion letter is corrected.

FIG. 28 is a schematic diagram illustrating an example of the display of a screen before the opinion letter is corrected. FIG. 28 illustrates an opinion letter 204, in which a first sentence 280 related to the lung, a second sentence 282 related to the liver, and a third sentence 284 related to the gall bladder are input and a fourth sentence 286 related to the kidney is being input, and a structuration process result 206 for the opinion letter 204.

Figure 29:
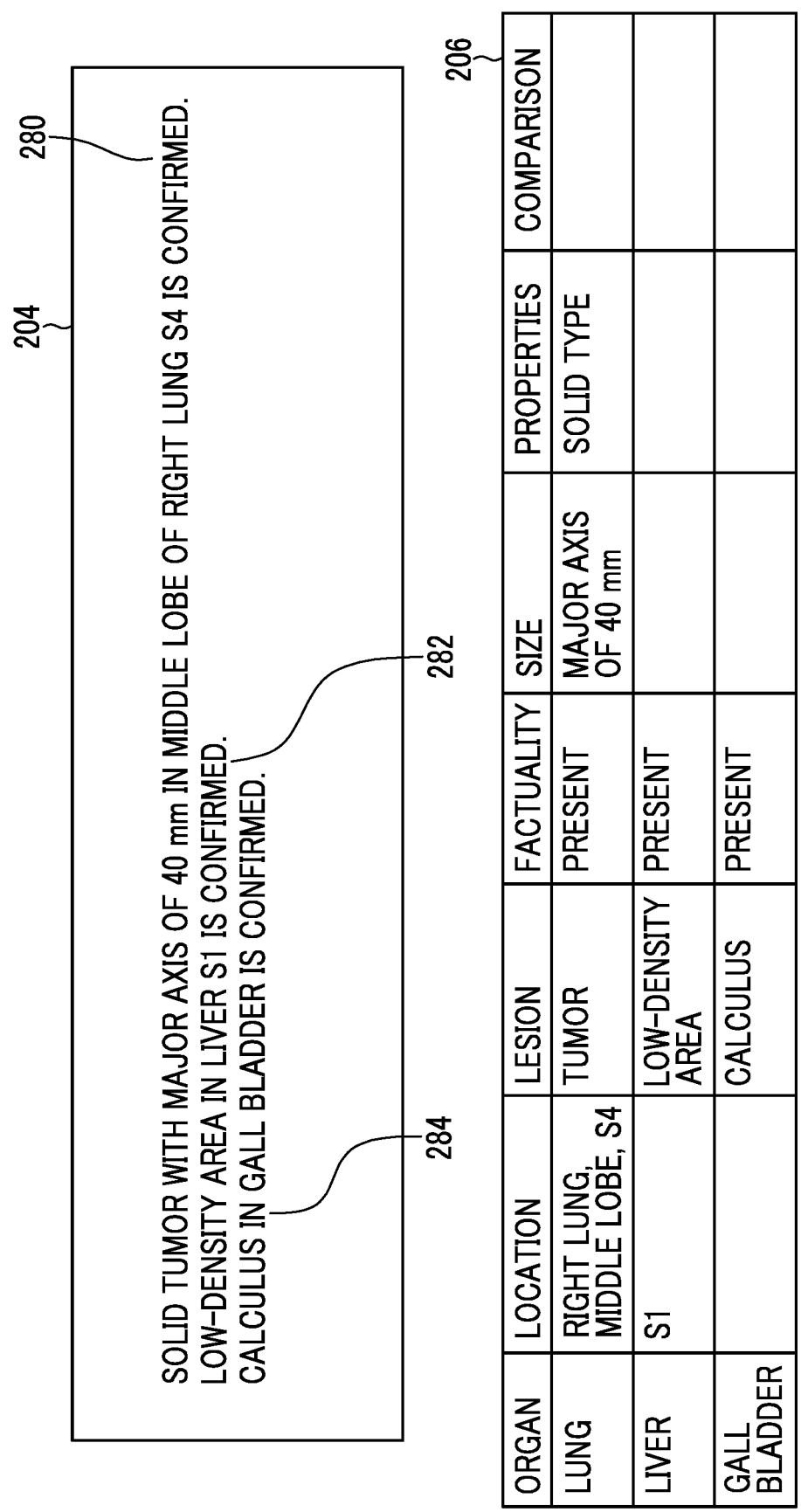
FIG. 29 is a schematic diagram illustrating an example of display while the opinion letter is being corrected.

FIG. 29 is a schematic diagram illustrating an example of display during the correction of the opinion letter. FIG. 29 illustrates the opinion letter 204 in which the fourth sentence 286 related to the kidney illustrated in FIG. 28 has been deleted. Since the structuration process for the lung, the liver, and the gall bladder has been confirmed, the structuration process result 206 is not changed.

FIG. 30 is a schematic diagram illustrating an example of display in a case in which the opinion letter has been corrected. In the opinion letter 204 illustrated in FIG. 30, a fourth sentence 286D related to the pancreas is input instead of the fourth sentence 286 related to the kidney illustrated in FIG. 28. A structuration process result 206D illustrated in FIG. 30 differs from the structuration process result 206 illustrated in FIGS. 28 and 29 in that the result of the structuration process for the fourth sentence 286D related to the pancreas is added.

In the aspect described with reference to FIGS. 28 to 30, the structuration process result 206 is corrected with the correction of the opinion letter 204. Therefore, the structuration process result 206 whose correspondence relationship with the corrected opinion letter 204 is maintained is generated.

Example of Display Corresponding to Addition of Opinion Letter

FIG. 31 is a schematic diagram illustrating an example of display before an opinion letter is added. FIG. 31 illustrates the opinion letter 204 including the first sentence 280 related to the lung, the second sentence 282 related to the liver, and the third sentence 284 related to the kidney and the structuration process result 206 for the opinion letter 204.

Figure 32:
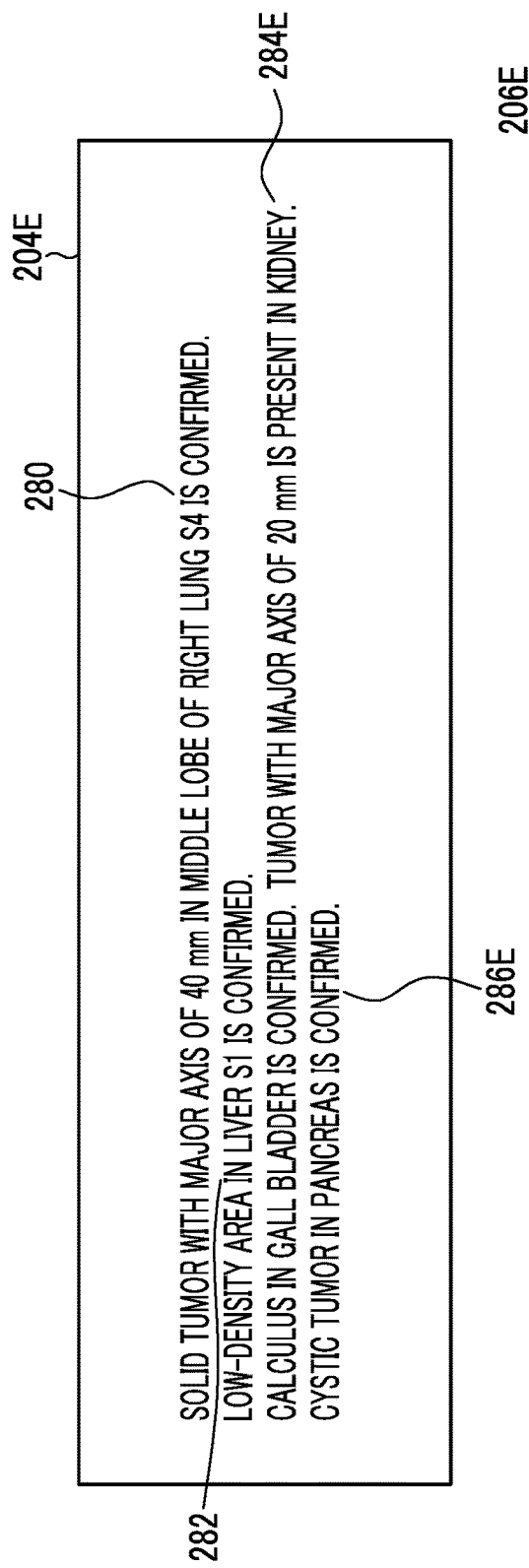
FIG. 32 is a schematic diagram illustrating an example of display in a case in which the opinion letter is added.

FIG. 32 is a schematic diagram illustrating an example of display in a case in which an opinion letter is added. An opinion letter 204E illustrated in FIG. 32 differs from the opinion letter 204 illustrated in FIG. 31 in that a third sentence 284E related to the gall bladder is added and the third sentence 284 related to the kidney illustrated in FIG. 31 is changed to a fourth sentence 286E.

In a structuration process result 206E illustrated in FIG. 32, a structuration process result field 294 related to the gall bladder is inserted between a structuration process result field 290 for the liver and a structuration process result field 292 for the pancreas, corresponding to the order of description of each sentence constituting the opinion letter 204E.

In addition, the position of the delimiter is also updated according to the addition of the third sentence 284E related to the gall bladder in the opinion letter 204E. That is, the position of the delimiter in the opinion letter 204 illustrated in FIG. 31 is between the first sentence 280 related to the lung and the second sentence 282 related to the liver and between the second sentence 282 related to the liver and the third sentence 284 related to the pancreas.

On the other hand, the position of the delimiter in the opinion letter 204E illustrated in FIG. 32 is between the first sentence 280 related to the lung and the second sentence 282 related to the liver, between the second sentence 282 related to the liver and the third sentence 284E related to the gall bladder, and between the third sentence 284E related to the gall bladder and the fourth sentence 286E related to the pancreas.

FIG. 33 is a schematic diagram illustrating an example of display before an opinion letter according to another example is added. An opinion letter 204 illustrated in FIG. 33 includes a first sentence 280 related to the lung, a second sentence 282 related to the liver, a third sentence 284 related to the gall bladder, a fourth sentence 286 related to the kidney, and a fifth sentence 288 related to the pancreas.

A structuration process result 206 illustrated in FIG. 33 includes the results of the structuration process for each of the first sentence 280 to the fifth sentence 288.

Figure 34:
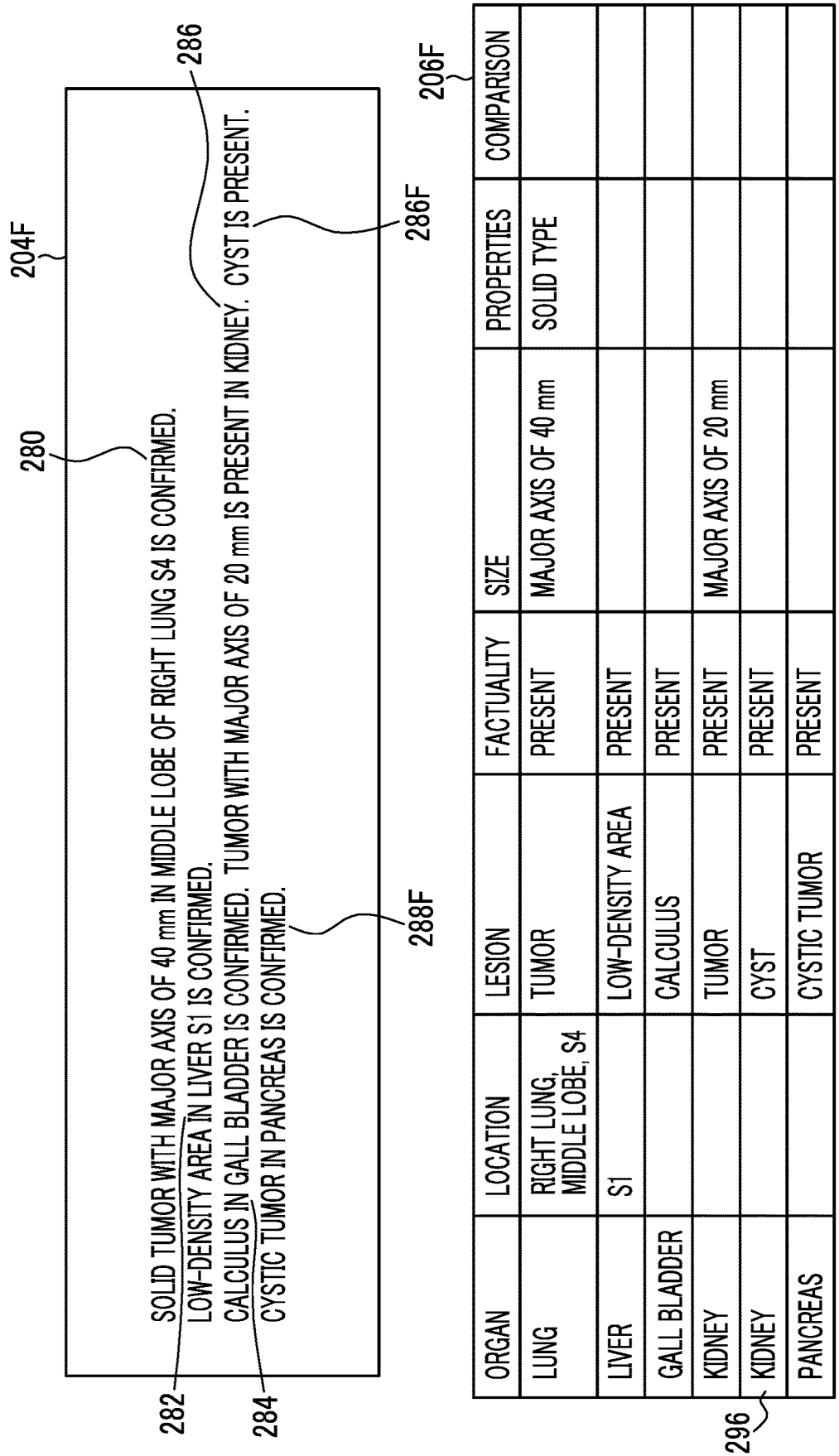
FIG. 34 is a schematic diagram illustrating an example of the display of a screen in a case in which the addition of the opinion letter according to another example has ended.

An opinion letter 204F illustrated in FIG. 34 differs from the opinion letter 204 illustrated in FIG. 33 in that a fifth sentence 286F related to the cyst of the kidney is added. Further, the fifth sentence 288 illustrated in FIG. 33 is changed to a sixth sentence 288F. The opinion letter 204F illustrated in FIG. 34 differs from the opinion letter 204 illustrated in FIG. 33 in that the position of the delimiter is changed.

In a structuration process result 206F illustrated in FIG. 34, a structuration process result field 296 related to the cyst of the kidney is added, corresponding to the addition of the fifth sentence 286F related to the kidney. In the structuration process result 206F illustrated in FIG. 34, the arrangement order of the organs is not changed as compared to the structuration process result 206 illustrated in FIG. 33. That is, the organs are arranged in the order of the lung, the liver, the gall bladder, the kidney, and the pancreas in the structuration process result 206 illustrated in FIG. 33. The arrangement order of the organs is the same in the structuration process result 206F illustrated in FIG. 34.

In the aspect described with reference to FIGS. 31 to 34, the structuration process result 206 is added according to the addition of the opinion letter 204. Therefore, the structuration process result 206 corresponding to the addition of the opinion letter 204 is generated.

Example of Display Related to Grouping

Figure 35:
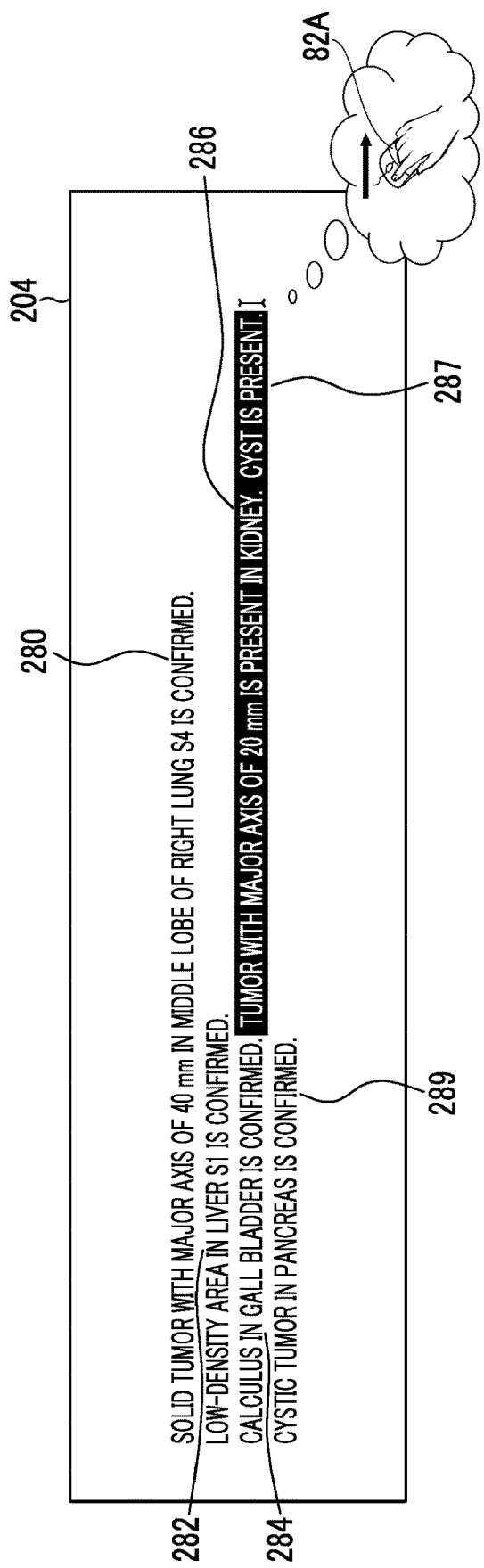
FIG. 35 is a schematic diagram illustrating an example of display before a sentence of the opinion letter is shifted.

FIG. 35 is a schematic diagram illustrating an example of display before the sentence of the opinion letter is shifted. FIG. 35 includes the first sentence 280 related to the lung, the second sentence 282 related to the liver, the third sentence 284 related to the gall bladder, the fourth sentence 286 related to the kidney, a fifth sentence 287 related to the cyst of the kidney, and a sixth sentence 289 related to the pancreas. In addition, FIG. 35 illustrates a structuration process result 206 corresponding to the opinion letter 204.

FIG. 35 illustrates a state in which, in a case in which the fourth sentence 286 related to the kidney and the fifth sentence 287 related to the cyst of the kidney are swapped with the sixth sentence 289 in order in the opinion letter 204, the fourth sentence 286 related to the kidney and the fifth sentence 287 related to the cyst of the kidney are selected and displayed to be highlighted.

FIG. 35 illustrates an aspect in which, in a case in which the fourth sentence 286 related to the kidney and the fifth sentence 287 related to the cyst of the kidney are selected, the operator selects the fourth sentence 286 related to the kidney and the fifth sentence 287 related to the cyst of the kidney with a mouse 82A and the medical information processing device 10 acquires the selection as a correction input.

Figure 36:
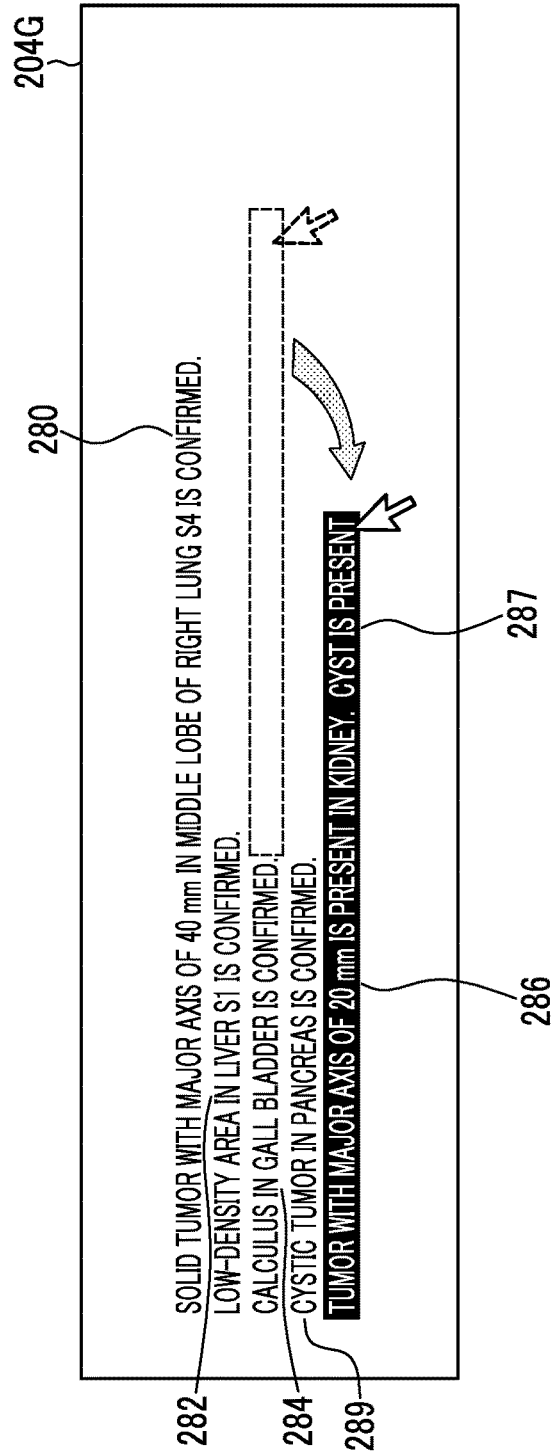
FIG. 36 is a schematic diagram illustrating an example of display in a case in which the shift of the opinion letter has been ended.

FIG. 36 is a schematic diagram illustrating an example of display in a case in which the shift of the opinion letter has been ended. In an opinion letter 204G illustrated in FIG. 36, the position of the fourth sentence 286 and the fifth sentence 287 is changed from the position following the third sentence 284 to a line following the sixth sentence 289.

In addition, in a structuration process result 206G illustrated in FIG. 36, the positions of a structuration process result field 298 and a structuration process result field 299 related to the kidney are changed corresponding to the change in the opinion letter 204G, as compared to the structuration process result 206 illustrated in FIG. 35.

In the aspect illustrated in FIGS. 35 and 36, the delimiter is monitored according to the attributes of the sentences, and the sentences are grouped on the basis of the attributes of the sentences. Then, for example, a drag operation can be performed using the mouse 82A to move the sentence to be shifted. Even in a case in which there are a plurality of sentences to be shifted, it is possible to select a plurality of sentences. In addition, the structuration process result 206 can be changed corresponding to the change in the opinion letter 204.

For Program for Operating Computer

A program that causes a computer to implement the processing functions of the medical information processing device 10 can be recorded on a computer-readable medium which is a non-transitory tangible information storage medium, such as an optical disk, a magnetic disk, or a semiconductor memory. Then, the program can be provided through the information storage medium.

Further, instead of the aspect in which the program is stored in the non-transitory tangible computer-readable medium and then provided, program signals may be provided as a download service using a telecommunication line such as the Internet.

Further, some or all of the processing functions of the medical information processing device 10 may be implemented by cloud computing or may be provided as a SasS service. In addition, SasS is an abbreviation of Software as a Service.

For Hardware Configuration of Each Processing Unit

For example, the following various processors are used as the hardware structure of processing units performing various processes, such as the medical text acquisition unit 12, the medical text processing unit 14, the medical text output unit 18, the delimiter monitoring unit 20, the structuration processing unit 24, and the structuration result output unit 28 in the medical information processing device 10.

The various processors include, for example, a CPU which is a general-purpose processor executing a program to function as various processing units, a GPU which is a processor specialized for image processing, a programmable logic device (PLD), such as a field programmable gate array (FPGA), which is a processor whose circuit configuration can be changed after manufacture, and a dedicated electric circuit, such as an ASIC, which is a processor having a dedicated circuit configuration designed to perform a specific process.

In addition, the programmable logic device may be referred to as a PLD which is an abbreviation of Programmable Logic Device in English. ASIC is an abbreviation of Application Specific Integrated Circuit.

One processing unit may be configured by one of the various processors or a combination of two or more processors of the same type or different types. For example, one processing unit may be configured using a plurality of FPGAs, a combination of a CPU and an FPGA, or a combination of a CPU and a GPU.

Further, a plurality of processing units may be configured by one processor. A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one IC chip is used. A representative example of this aspect is a system on chip. In addition, the system on chip can be referred to a SoC which is an abbreviation of System On a Chip. IC is an abbreviation of Integrated Circuit.

As described above, various processing units are configured using one or more of the various processors as a hardware structure. In addition, specifically, the hardware structure of the various processors is an electric circuit (circuitry) obtained by combining circuit elements such as semiconductor elements.

Operation and Effect of Embodiment

The medical information processing device according to the embodiment can obtain the following operation and effect.

[1]

A sentence constituting an opinion letter is acquired during the input of the opinion letter, the switching of the attributes of the terms described in the acquired sentence is determined as a delimiter of the opinion letter, a structuration process is performed for each unit delimited by the delimiter, and the result of the structuration process is displayed. Therefore, it is possible to output the result of the structuration process for each unit of the delimiter, without waiting for the end of the creation of the opinion letter.

That is, at the timing when the delimiter is determined, the structuration process is performed for each unit delimited by the delimiter. Therefore, it is possible to perform the structuration process having a relatively heavy processing load during the creation of the opinion letter, as compared to a case in which the structuration process is performed after the opinion letter is created, and to suppress the stress of waiting for processing for a user such as a doctor.

[2]

In a case in which the delimiter of the opinion letter is detected, the structuration process is performed for each unit of the delimiter even during the input of the next sentence. Therefore, it is possible to output the result of the structuration process for each unit of the delimiter, without waiting for the confirmation of the opinion letter.

[3]

A provisional result of the structuration process for each sentence is output until the delimiter of the opinion letter is detected. Therefore, it is possible to output the result of the structuration process for the sentence whose input has been ended during the input of the opinion letter.

[4]

In a case in which the result of the structuration process is confirmed, the display aspect of the result of the structuration process is changed. Therefore, the user can visually recognize the confirmation of the result of the structuration process.

[5]

Before the delimiter of the opinion letter is determined, term extraction is performed for each sentence, and different display aspects are applied for each attribute of the term. Therefore, the user can visually recognize the attributes of the terms of the sentence constituting the opinion letter.

[6]

In a case in which the result of the structuration process is confirmed, the display aspect of the sentence for which the result of the structuration process has been confirmed is changed. Therefore, the user can visually recognize the sentence for which the result of the structuration process has been confirmed.

[7]

A human body schema associated with the result of the structuration process is displayed. Therefore, the user can visually recognize the correspondence relationship between the result of the structuration process and the organ.

[8]

The opinion letter created in the past examination is acquired, and the result of the structuration process for the opinion letter created in the past examination is reflected in the result of the structuration process for the opinion letter created in the current examination. Therefore, it is possible to relatively increase the amount of information of the result of the structuration process.

[9]

The result of the structuration process is corrected corresponding to the correction of the opinion letter. Therefore, the opinion letter and the result of the structuration process are matched with each other.

The technical scope of the invention is not limited to the scope according to the above-described embodiment. The configurations and the like in each embodiment can be appropriately combined between the embodiments without departing from the gist of the invention.

EXPLANATION OF REFERENCES

10: medical information processing device
12: medical text acquisition unit 14: medical text processing unit
16: medical text storage unit
18: medical text output unit
20: delimiter monitoring unit
22: delimiter information storage unit
24: structuration processing unit
26: structuration result storage unit
28: structuration result output unit
30: display unit
50: processor
52: computer-readable medium
54: communication interface
56: input/output interface
58: bus
60: memory
62: storage
70: delimiter monitoring program
72: structuration program
74: medical text processing program
80: display device
82: input device
82A: mouse
100: medical information management system
102: examination order system
104: electronic medical record system
106: image management system
108: interpretation report system
109: image processing system
110: modalities
112: CT apparatus
114: MRI apparatus
116: ultrasound diagnostic apparatus
118: PET apparatus
120: X-ray diagnostic apparatus
122: X-ray fluoroscopy apparatus
124: endoscopic apparatus
130: communication line
132: terminal device
200: display screen
202: medical image
204: opinion letter
204B: opinion letter
204E: opinion letter
204F: opinion letter
204G: opinion letter
210: medical image display portion
212: text display portion
220: first sentence
222: second sentence
224: third sentence
226: fourth sentence
228: fifth sentence
240: delimiter
250: human body schema
252: lung
254: liver
260: first sentence
262: second sentence
280: first sentence
282: second sentence
284: third sentence
284E: third sentence
286: fourth sentence
286D: fourth sentence
286E: fourth sentence
286F: fifth sentence
287: fifth sentence
288: fifth sentence
288F: sixth sentence
289: sixth sentence
290: structuration process result field
292: structuration process result field
294: structuration process result field
296: structuration process result field
298: structuration process result field
299: structuration process result field
Each step from S10 to S24: each step of structuration processing method

What is claimed is:

1. A medical information processing device comprising:
one or more processors; and
one or more memories that store a program to be executed by the one or more processors,
wherein the one or more processors is configured to execute commands of the program to acquire a medical report which comprises a plurality of sentences input by a user,
to extract, from the medical report, a first sentence of the plurality of sentences that describes a first body part and a second sentence of the plurality of sentences that describes a second body part,
to determine switching from the first body part to the second body part in the plurality of sentences as a delimiter of the plurality of sentences,
to perform a structuration process for the first sentence of the plurality of sentences corresponding to the first body part and the second sentence corresponding to the second body part delimited by the delimiter by generating a first text corresponding to the first sentence and by generating a second text corresponding to the second sentence as a result of the structuration process, wherein the result of the structuration process comprises the first text and the second text,
to add the result of the structuration process to the medical report, and
to display the medical report along with the result of the structuration process.

2. The medical information processing device according to claim 1,
wherein the first sentence includes an opinion on a medical image.

3. The medical information processing device according to claim 2,
wherein the one or more processors determine switching of a term of a human organ indicating the switching from the first body part to the second body part on the medical image as the delimiter of the sentence.

4. The medical information processing device according to claim 2,
wherein the result of the structuration process includes a plurality of properties associated with each human organ.

5. The medical information processing device according to claim 1,
wherein the one or more processors displays the medical report along with the result of the structuration process to a display device.

6. The medical information processing device according to claim 1,
wherein the one or more processors output a provisional result of the structuration process.

7. The medical information processing device according to claim 1,
wherein the one or more processors is configured to:

acquire a past medical text created in a pas, and output the result of the structuration process for the acquired sentence in association with a second result of a second structuration process for the past medical text.

8. The medical information processing device according to claim 7, wherein the one or more processors is configured to add information, which is described in the past medical text and is not described in the acquired medical text, to the result of the structuration process.

9. The medical information processing device according to claim 1, wherein the one or more processors output the result of the structuration process in association with a human body schema.

10. The medical information processing device according to claim 1, wherein the result of the structuration process includes a lesion associated with a human organ.

11. The medical information processing device according to claim 10, wherein the result of the structuration process includes a presence or absence of the lesion associated with a human organ.

12. The medical information processing device according to claim 1, wherein the one or more processors is configured to acquire a term in the first sentence and perform the structuration process including a term extraction process of determining a body part of the acquired term.

13. The medical information processing device according to claim 1, wherein the one or more processors group the plurality of sentences on the basis of the result of the structuration process.

14. The medical information processing device according to claim 13, wherein the one or more processors perform the grouping on the basis of a relationship between a plurality of terms extracted in the structuration process.

15. The medical information processing device according to claim 13, wherein the one or more processors output identification information that identifies a result of the grouping in the acquired sentences.

16. The medical information processing device according to claim 13, wherein the one or more processors acquire information indicating a shift of each grouped unit in the acquired sentences.

17. The medical information processing device according to claim 1, wherein the one or more processors store the delimiter of the acquired sentence.

18. The medical information processing device according to claim 17, wherein the one or more processors
acquire a correction input indicating correction of the sentence input by the user, and update the delimiter according to the correction in a case in which the correction input is acquired.

19. A method for operating a medical information processing device including one or more processors and one or more memories that store a program to be executed by the one or more processors, the method comprising:

causing the one or more processors to acquire a medical report which comprises a plurality of sentences input by a user;

causing the one or more processors to extract, from the medical report, a first sentence of the plurality of sentences that describes a first body part and a second sentence of the plurality of sentences that describes a second body part, causing the one or more processors to determine switching of from the first body part to the second body part in the plurality of sentences as a delimiter of the plurality of sentences;

causing the one or more processors to perform a structuration process for the first sentence of the plurality of sentences corresponding to the first body part and the second sentence corresponding to the second body part delimited by the delimiter by generating a first text corresponding to the first sentence and by generating a second text corresponding to the second sentence as a result of the structuration process, wherein the result of the structuration process comprises the first text and the second text;

causing the one or more processors to add the result of the structuration process to the medical report; and causing the one or more processors to display the medical report along with the result of the structuration process.

20. A non-transitory, computer-readable tangible recording medium which records thereon a program that causes, when read by a computer, the computer to implement:

a function of acquiring a medical report which comprises a plurality of sentences input by a user;

a function of extracting, from the medical report, a first sentence of the plurality of sentences that describes a first body part and a second sentence of the plurality of sentences that describes a second body part, a function of determining switching from the first body part to the second body part in the plurality of sentences as a delimiter of the plurality of sentences;

a function of performing a structuration process for the first sentence of the plurality of sentences corresponding to the first body part and the second sentence corresponding to the second body part delimited by the delimiter by generating a first text corresponding to the first sentence and by generating a second text corresponding to the second sentence as a result of the structuration process, wherein the result of the structuration process comprises the first text and the second text;

a function of adding the result of the structuration process to the medical report; and a function of displaying the medical report along with the result of the structuration process.

* * * * *